(12) United States Patent
Radlein et al.

(10) Patent No.: US 9,742,795 B1
(45) Date of Patent: Aug. 22, 2017

(54) MITIGATING NETWORK ATTACKS

(71) Applicant: Amazon Technologies, Inc., Seattle, WA (US)

(72) Inventors: Anton Stephen Radlein, Seattle, WA (US); Nathan Alan Dye, Seattle, WA (US); Craig Wesley Howard, Seattle, WA (US); Harvo Reyzell Jones, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 14/864,683

(22) Filed: Sep. 24, 2015

(51) Int. Cl.
H04L 29/06 (2006.01)

(52) U.S. Cl.
CPC ...... *H04L 63/1441* (2013.01); *H04L 63/0218* (2013.01); *H04L 63/1416* (2013.01); *H04L 63/1458* (2013.01)

(58) Field of Classification Search
CPC .................. H04L 63/1458; H04L 63/0218
See application file for complete search history.

(56) References Cited

U.S. PATENT DOCUMENTS

| | | | |
|---|---|---|---|
| 5,063,500 A | 11/1991 | Shorter | |
| 5,341,477 A | 8/1994 | Pitkin et al. | |
| 5,459,837 A | 10/1995 | Caccavale | |
| 5,611,049 A | 3/1997 | Pitts | |
| 5,701,467 A | 12/1997 | Freeston | |
| 5,764,910 A | 6/1998 | Shachar | |
| 5,774,660 A | 6/1998 | Brendel et al. | |
| 5,852,717 A | 12/1998 | Bhide et al. | |
| 5,892,914 A | 4/1999 | Pitts | |

(Continued)

FOREIGN PATENT DOCUMENTS

| | | |
|---|---|---|
| CA | 2741 895 A1 | 5/2010 |
| CN | 1422468 A | 6/2003 |
| CN | 1511399 A | 7/2004 |
| CN | 1605182 A | 4/2005 |
| CN | 101189598 A | 5/2008 |
| CN | 101460907 A | 6/2009 |
| CN | 103731481 A | 4/2014 |

(Continued)

OTHER PUBLICATIONS

Kenshi, P., "Help File Library: Iptables Basics," Justlinux, retrieved Dec. 1, 2005, from http://www.justlinux.com/nhf/Security/Iptables _ Basics.html, 4 pages.

(Continued)

*Primary Examiner* — James Turchen
(74) *Attorney, Agent, or Firm* — Knobbe, Martens, Olson & Bear, LLP

(57) ABSTRACT

Systems and methods are described that enable the mitigation of network attacks directed to specific sets of content on a content delivery system. A set of content targeted in the attack may be identified based at least in part on a combination of network addresses to which attacked-related packets are transmitted. Thereafter, the content delivery system may mitigate the attack based on the identified target. For example, where both targeted and non-targeted sets of content are associated with the attacked network addresses, traffic directed to these sets of content may be separated, e.g., in order to reduce the impact of the attack on the non-targeted sets of content or increase the computing resources available to the targeted content. Redirection of traffic may occur using either or both of resolution-based redirection or routing-based redirection.

23 Claims, 10 Drawing Sheets

(56) References Cited

U.S. PATENT DOCUMENTS

| | | | |
|---|---|---|---|
| 5,893,116 | A | 4/1999 | Simmonds et al. |
| 5,895,462 | A | 4/1999 | Toki |
| 5,905,248 | A | 5/1999 | Russell et al. |
| 5,933,811 | A | 8/1999 | Angles et al. |
| 5,937,427 | A | 8/1999 | Shinagawa et al. |
| 5,974,454 | A | 10/1999 | Apfel et al. |
| 5,991,306 | A | 11/1999 | Burns et al. |
| 6,016,512 | A | 1/2000 | Huitema |
| 6,026,452 | A | 2/2000 | Pitts |
| 6,038,601 | A | 3/2000 | Lambert et al. |
| 6,052,718 | A | 4/2000 | Gifford |
| 6,078,960 | A | 6/2000 | Ballard |
| 6,085,234 | A | 7/2000 | Pitts et al. |
| 6,092,100 | A | 7/2000 | Berstis et al. |
| 6,098,096 | A | 8/2000 | Tsirigotis et al. |
| 6,108,703 | A | 8/2000 | Leighton et al. |
| 6,128,279 | A | 10/2000 | O'Neil et al. |
| 6,151,631 | A | 11/2000 | Ansell et al. |
| 6,157,942 | A | 12/2000 | Chu et al. |
| 6,167,438 | A | 12/2000 | Yates et al. |
| 6,167,446 | A | 12/2000 | Lister et al. |
| 6,182,111 | B1 | 1/2001 | Inohara et al. |
| 6,182,125 | B1 | 1/2001 | Borella et al. |
| 6,185,598 | B1 | 2/2001 | Farber et al. |
| 6,192,051 | B1 | 2/2001 | Lipman et al. |
| 6,205,475 | B1 | 3/2001 | Pitts |
| 6,223,288 | B1 | 4/2001 | Byrne |
| 6,243,761 | B1 | 6/2001 | Mogul et al. |
| 6,275,496 | B1 | 8/2001 | Burns et al. |
| 6,286,043 | B1 | 9/2001 | Cuomo et al. |
| 6,286,084 | B1 | 9/2001 | Wexler et al. |
| 6,304,913 | B1 | 10/2001 | Rune |
| 6,324,580 | B1 | 11/2001 | Jindal et al. |
| 6,330,602 | B1 | 12/2001 | Law et al. |
| 6,338,082 | B1 | 1/2002 | Schneider |
| 6,345,308 | B1 | 2/2002 | Abe |
| 6,351,743 | B1 | 2/2002 | DeArdo et al. |
| 6,351,775 | B1 | 2/2002 | Yu |
| 6,363,411 | B1 | 3/2002 | Dugan et al. |
| 6,366,952 | B2 | 4/2002 | Pitts |
| 6,374,290 | B1 | 4/2002 | Scharber et al. |
| 6,377,257 | B1 | 4/2002 | Borrel et al. |
| 6,386,043 | B1 | 5/2002 | Mullins |
| 6,405,252 | B1 | 6/2002 | Gupta et al. |
| 6,408,360 | B1 | 6/2002 | Chamberlain et al. |
| 6,411,967 | B1 | 6/2002 | Van Renesse |
| 6,415,280 | B1 | 7/2002 | Farber et al. |
| 6,430,607 | B1 | 8/2002 | Kavner |
| 6,438,592 | B1 | 8/2002 | Killian |
| 6,442,165 | B1 | 8/2002 | Sitaraman et al. |
| 6,452,925 | B1 | 9/2002 | Sistanizadeh et al. |
| 6,457,047 | B1 | 9/2002 | Chandra et al. |
| 6,459,909 | B1 | 10/2002 | Bilcliff et al. |
| 6,473,804 | B1 | 10/2002 | Kaiser et al. |
| 6,484,143 | B1 | 11/2002 | Swildens et al. |
| 6,484,161 | B1 | 11/2002 | Chipalkatti et al. |
| 6,493,765 | B1 | 12/2002 | Cunningham et al. |
| 6,505,241 | B2 | 1/2003 | Pitts |
| 6,523,036 | B1 | 2/2003 | Hickman et al. |
| 6,529,910 | B1 | 3/2003 | Fleskes |
| 6,529,953 | B1 | 3/2003 | Van Renesse |
| 6,553,413 | B1 | 4/2003 | Leighton et al. |
| 6,560,610 | B1 | 5/2003 | Eatherton et al. |
| 6,611,873 | B1 | 8/2003 | Kanehara |
| 6,622,168 | B1 | 9/2003 | Datta |
| 6,643,357 | B2 | 11/2003 | Lumsden |
| 6,643,707 | B1 | 11/2003 | Booth |
| 6,654,807 | B2 | 11/2003 | Farber et al. |
| 6,658,462 | B1 | 12/2003 | Dutta |
| 6,665,706 | B2 | 12/2003 | Kenner et al. |
| 6,678,717 | B1 | 1/2004 | Schneider |
| 6,678,791 | B1 | 1/2004 | Jacobs et al. |
| 6,681,282 | B1 | 1/2004 | Golden et al. |
| 6,694,358 | B1 | 2/2004 | Swildens et al. |
| 6,697,805 | B1 | 2/2004 | Choquier et al. |
| 6,724,770 | B1 | 4/2004 | Van Renesse |
| 6,732,237 | B1 | 5/2004 | Jacobs et al. |
| 6,754,699 | B2 | 6/2004 | Swildens et al. |
| 6,754,706 | B1 | 6/2004 | Swildens et al. |
| 6,760,721 | B1 | 7/2004 | Chasen et al. |
| 6,769,031 | B1 | 7/2004 | Bero |
| 6,782,398 | B1 | 8/2004 | Bahl |
| 6,785,704 | B1 | 8/2004 | McCanne |
| 6,795,434 | B1 | 9/2004 | Kumar et al. |
| 6,799,214 | B1 | 9/2004 | Li |
| 6,804,706 | B2 | 10/2004 | Pitts |
| 6,810,291 | B2 | 10/2004 | Card et al. |
| 6,810,411 | B1 | 10/2004 | Coughlin et al. |
| 6,829,654 | B1 | 12/2004 | Jungck |
| 6,862,607 | B1 | 3/2005 | Vermeulen |
| 6,868,439 | B2 | 3/2005 | Basu et al. |
| 6,874,017 | B1 | 3/2005 | Inoue et al. |
| 6,917,951 | B2 | 7/2005 | Orbits et al. |
| 6,928,467 | B2 | 8/2005 | Peng et al. |
| 6,928,485 | B1 | 8/2005 | Krishnamurthy et al. |
| 6,941,562 | B2 | 9/2005 | Gao et al. |
| 6,963,850 | B1 | 11/2005 | Bezos et al. |
| 6,976,090 | B2 | 12/2005 | Ben-Shaul et al. |
| 6,981,017 | B1 | 12/2005 | Kasriel et al. |
| 6,985,945 | B2 | 1/2006 | Farhat et al. |
| 6,986,018 | B2 | 1/2006 | O'Rourke et al. |
| 6,990,526 | B1 | 1/2006 | Zhu |
| 6,996,616 | B1 | 2/2006 | Leighton et al. |
| 7,003,555 | B1 | 2/2006 | Jungck |
| 7,006,099 | B2 | 2/2006 | Gut et al. |
| 7,007,089 | B2 | 2/2006 | Freedman |
| 7,010,578 | B1 | 3/2006 | Lewin et al. |
| 7,010,598 | B2 | 3/2006 | Sitaraman et al. |
| 7,024,466 | B2 | 4/2006 | Outten et al. |
| 7,031,445 | B2 | 4/2006 | Lumsden |
| 7,032,010 | B1 | 4/2006 | Swildens et al. |
| 7,058,633 | B1 | 6/2006 | Gnagy et al. |
| 7,058,706 | B1 | 6/2006 | Iyer et al. |
| 7,058,953 | B2 | 6/2006 | Willard et al. |
| 7,065,587 | B2 | 6/2006 | Huitema et al. |
| 7,072,982 | B2 | 7/2006 | Teodosiu et al. |
| 7,076,633 | B2 | 7/2006 | Tormasov et al. |
| 7,082,476 | B1 | 7/2006 | Cohen et al. |
| 7,086,061 | B1 | 8/2006 | Joshi et al. |
| 7,092,505 | B2 | 8/2006 | Allison et al. |
| 7,092,997 | B1 | 8/2006 | Kasriel et al. |
| 7,096,266 | B2 | 8/2006 | Lewin et al. |
| 7,099,936 | B2 | 8/2006 | Chase et al. |
| 7,103,645 | B2 | 9/2006 | Leighton et al. |
| 7,114,160 | B2 | 9/2006 | Suryanarayana et al. |
| 7,117,262 | B2 | 10/2006 | Bai et al. |
| 7,133,905 | B2 | 11/2006 | Dilley et al. |
| 7,136,922 | B2 | 11/2006 | Sundaram et al. |
| 7,139,808 | B2 | 11/2006 | Anderson et al. |
| 7,139,821 | B1 | 11/2006 | Shah et al. |
| 7,143,169 | B1 | 11/2006 | Champagne et al. |
| 7,143,170 | B2 | 11/2006 | Swildens et al. |
| 7,146,560 | B2 | 12/2006 | Dang et al. |
| 7,149,809 | B2 | 12/2006 | Barde et al. |
| 7,152,118 | B2 | 12/2006 | Anderson, IV et al. |
| 7,162,539 | B2 | 1/2007 | Garcie-Luna-Aceves |
| 7,174,382 | B2 | 2/2007 | Ramanathan et al. |
| 7,185,063 | B1 | 2/2007 | Kasriel et al. |
| 7,185,084 | B2 | 2/2007 | Sirivara et al. |
| 7,188,214 | B1 | 3/2007 | Kasriel et al. |
| 7,194,522 | B1 | 3/2007 | Swildens et al. |
| 7,194,552 | B1 | 3/2007 | Schneider |
| 7,200,667 | B2 | 4/2007 | Teodosiu et al. |
| 7,216,170 | B2 | 5/2007 | Ludvig et al. |
| 7,225,254 | B1 | 5/2007 | Swildens et al. |
| 7,228,350 | B2 | 6/2007 | Hong et al. |
| 7,228,359 | B1 | 6/2007 | Monteiro |
| 7,233,978 | B2 | 6/2007 | Overton et al. |
| 7,240,100 | B1 | 7/2007 | Wein et al. |
| 7,249,196 | B1 | 7/2007 | Peiffer et al. |
| 7,251,675 | B1 | 7/2007 | Kamakura et al. |
| 7,254,626 | B1 | 8/2007 | Kommula et al. |
| 7,254,636 | B1 | 8/2007 | O'Toole, Jr. et al. |
| 7,257,581 | B1 | 8/2007 | Steele et al. |

(56) References Cited

U.S. PATENT DOCUMENTS

| | | | |
|---|---|---|---|
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 * | 8/2009 | Swildens ............... G06F 9/505 709/202 |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlstedt et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,199 B1 | 4/2012 | Hoche-Mong et al. |
| 8,156,243 B2 | 4/2012 | Richardson et al. |
| 8,175,863 B1 | 5/2012 | Ostermeyer et al. |
| 8,190,682 B2 | 5/2012 | Paterson-Jones et al. |
| 8,195,837 B2 | 6/2012 | McCarthy et al. |

(56) References Cited

U.S. PATENT DOCUMENTS

| | | |
|---|---|---|
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,301,645 B1 | 10/2012 | Crook |
| 8,321,568 B2 | 11/2012 | Sivasubramanian et al. |
| 8,380,831 B2 | 2/2013 | Barber |
| 8,402,137 B2 | 3/2013 | Sivasubramanian et al. |
| 8,433,749 B2 | 4/2013 | Wee et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,880 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,826,032 B1 | 9/2014 | Yahalom et al. |
| 8,904,009 B1 | 12/2014 | Marshall et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,949,459 B1 | 2/2015 | Scholl |
| 8,966,318 B1 | 2/2015 | Shah |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,116,803 B1 | 8/2015 | Agrawal et al. |
| 9,130,756 B2 | 9/2015 | Richardson et al. |
| 9,130,977 B2 | 9/2015 | Zisapel et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,235 B2 | 12/2015 | Sivasubramanian et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,391,949 B1 | 7/2016 | Richardson et al. |
| 9,407,681 B1 | 8/2016 | Richardson et al. |
| 9,407,699 B2 | 8/2016 | Sivasubramanian et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |

(56) References Cited

U.S. PATENT DOCUMENTS

| | | |
|---|---|---|
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0143675 A1 | 10/2002 | Orshan |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010563 A1 | 1/2004 | Forte et al. |
| 2004/0010588 A1 | 1/2004 | Slater et al. |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |

(56) References Cited

U.S. PATENT DOCUMENTS

| | | |
|---|---|---|
| 2005/0192008 A1 | 9/2005 | Desai et al. |
| 2005/0198334 A1 | 9/2005 | Farber et al. |
| 2005/0198571 A1 | 9/2005 | Kramer et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings et al. |
| 2005/0266835 A1 | 12/2005 | Agrawal et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0136453 A1 | 6/2006 | Kwan |
| 2006/0143293 A1 | 6/2006 | Freedman |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0243860 A1 | 10/2007 | Aiello et al. |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tai |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |

(56) References Cited

U.S. PATENT DOCUMENTS

| | | |
|---|---|---|
| 2008/0046550 A1 | 2/2008 | Mazur et al. |
| 2008/0046596 A1 | 2/2008 | Afergan et al. |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0263135 A1 | 10/2008 | Olliphant |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1* | 10/2009 | Jungck .............. H04L 29/12066 370/392 |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0023601 A1 | 1/2010 | Lewin et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0057894 A1 | 3/2010 | Glasser |
| 2010/0070603 A1 | 3/2010 | Moss et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |

(56) References Cited

U.S. PATENT DOCUMENTS

| | | |
|---|---|---|
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agrawal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0036238 A1 | 2/2012 | Sundaram et al. |
| 2012/0066360 A1 | 3/2012 | Ghosh |
| 2012/0072600 A1 | 3/2012 | Richardson et al. |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0110515 A1 | 5/2012 | Abramoff et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0224516 A1 | 9/2012 | Stojanovski et al. |
| 2012/0233522 A1 | 9/2012 | Barton et al. |
| 2012/0233668 A1 | 9/2012 | Leafe et al. |
| 2012/0254961 A1 | 10/2012 | Kim et al. |
| 2012/0257628 A1 | 10/2012 | Bu et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0019311 A1 | 1/2013 | Swildens et al. |
| 2013/0034099 A1 | 2/2013 | Hikichi et al. |
| 2013/0041872 A1 | 2/2013 | Aizman et al. |
| 2013/0046869 A1 | 2/2013 | Jenkins et al. |
| 2013/0067530 A1 | 3/2013 | Spektor et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0086001 A1 | 4/2013 | Bhogal et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0254879 A1 | 9/2013 | Chesla et al. |
| 2013/0263256 A1* | 10/2013 | Dickinson ............ H04L 63/1458 726/22 |
| 2013/0268616 A1 | 10/2013 | Sakata et al. |
| 2013/0305046 A1 | 11/2013 | Mankovski et al. |
| 2013/0311605 A1 | 11/2013 | Richardson et al. |
| 2013/0311989 A1 | 11/2013 | Ota et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0006577 A1 | 1/2014 | Joe et al. |
| 2014/0007239 A1 | 1/2014 | Sharpe et al. |
| 2014/0019605 A1 | 1/2014 | Boberg |
| 2014/0036675 A1 | 2/2014 | Wang et al. |
| 2014/0040478 A1 | 2/2014 | Hsu et al. |
| 2014/0053022 A1 | 2/2014 | Forgette et al. |
| 2014/0059120 A1 | 2/2014 | Richardson et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0089917 A1 | 3/2014 | Attalla et al. |
| 2014/0108672 A1 | 4/2014 | Ou et al. |
| 2014/0137111 A1 | 5/2014 | Dees et al. |
| 2014/0143320 A1 | 5/2014 | Sivasubramanian et al. |
| 2014/0164817 A1 | 6/2014 | Bartholomy et al. |
| 2014/0165061 A1 | 6/2014 | Greene et al. |
| 2014/0257891 A1 | 9/2014 | Richardson et al. |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0067171 A1 | 3/2015 | Yum |
| 2015/0081842 A1 | 3/2015 | Richardson et al. |
| 2015/0172379 A1 | 6/2015 | Richardson et al. |
| 2015/0172407 A1 | 6/2015 | MacCarthaigh et al. |

(56) References Cited

U.S. PATENT DOCUMENTS

| | | | |
|---|---|---|---|
| 2015/0172414 A1 | 6/2015 | Richardson et al. | |
| 2015/0172415 A1 | 6/2015 | Richardson et al. | |
| 2015/0180988 A1 | 6/2015 | Sivasubramanian et al. | |
| 2015/0188994 A1 | 7/2015 | Marshall et al. | |
| 2015/0195244 A1 | 7/2015 | Richardson et al. | |
| 2015/0207733 A1 | 7/2015 | Richardson et al. | |
| 2015/0215270 A1 | 7/2015 | Sivasubramanian et al. | |
| 2015/0229710 A1 | 8/2015 | Sivasubramanian et al. | |
| 2015/0244580 A1* | 8/2015 | Saavedra ............ | H04L 41/0816 709/221 |
| 2015/0249579 A1 | 9/2015 | Ellsworth et al. | |
| 2015/0256647 A1 | 9/2015 | Richardson et al. | |
| 2015/0319194 A1 | 11/2015 | Richardson et al. | |
| 2015/0319260 A1 | 11/2015 | Watson | |
| 2015/0334082 A1 | 11/2015 | Richardson et al. | |
| 2016/0006672 A1* | 1/2016 | Saavedra ............... | H04L 49/00 370/401 |
| 2016/0021197 A1 | 1/2016 | Pogrebinsky et al. | |
| 2016/0026568 A1 | 1/2016 | Marshall et al. | |
| 2016/0028644 A1 | 1/2016 | Richardson et al. | |
| 2016/0041910 A1 | 2/2016 | Richardson et al. | |
| 2016/0065665 A1 | 3/2016 | Richardson et al. | |
| 2016/0072720 A1 | 3/2016 | Richardson et al. | |
| 2016/0134492 A1 | 5/2016 | Ellsworth et al. | |
| 2016/0142367 A1 | 5/2016 | Richardson et al. | |
| 2016/0182454 A1* | 6/2016 | Phonsa ............... | H04L 63/0263 726/11 |
| 2016/0205062 A1 | 7/2016 | Mostert | |
| 2016/0241637 A1 | 8/2016 | Marr et al. | |
| 2016/0241639 A1 | 8/2016 | Brookins et al. | |
| 2016/0241651 A1 | 8/2016 | Sivasubramanian et al. | |
| 2016/0308959 A1 | 10/2016 | Richardson et al. | |

FOREIGN PATENT DOCUMENTS

| | | |
|---|---|---|
| EP | 1603307 A2 | 12/2005 |
| EP | 1351141 A2 | 10/2007 |
| EP | 2008167 A2 | 12/2008 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 2007-133896 A | 5/2007 |
| JP | 2007-207225 A | 8/2007 |
| JP | 2008-515106 | 5/2008 |
| JP | 2009-071538 A | 4/2009 |
| JP | 2012-509623 | 4/2012 |
| JP | 2012-209623 | 10/2012 |
| WO | WO 02/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |

OTHER PUBLICATIONS

Office Action in Japanese Application No. 2014-225580 dated Oct. 26, 2015.
Second Office Action in Chinese Application No. 201180046104.0 mailed Sep. 29, 2015.
Office Action in Canadian Application No. 2816612 dated Nov. 3, 2015.
Office Action in Japanese Application No. 2011-502139 dated Aug. 17, 2015.
Third Office Action in Chinese Application No. 201180046104.0 mailed Apr. 14, 2016.
Office Action in Japanese Application No. 2015-533132 dated Apr. 25, 2016.
Office Action in Canadian Application No. 2884796 dated Apr. 28, 2016.
Office Action in Japanese Application No. 2015-075644 mailed Apr. 5, 2016 in 15 pages.
Office Action in Japanese Application No. 2011-516466 mailed May 30, 2016.
Office Action in Russian Application No. 2015114568 dated May 16, 2016.
Office Action in Chinese Application No. 201310537815.9 dated Jul. 5, 2016.
Office Action in Chinese Application No. 201310717573.1 dated Jul. 29, 2016.
"Non-Final Office Action dated Jan. 3, 2012," U.S. Appl. No. 12/652,541; Jan. 3, 2012; 35 pages.
"Final Office Action dated Sep. 5, 2012," U.S. Appl. No. 12/652,541; Sep. 5, 2012; 40 pages.
"Notice of Allowance dated Jan. 4, 2013," U.S. Appl. No. 12/652,541; Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL: http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.

(56) References Cited

OTHER PUBLICATIONS

"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls,";login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. Of Networking 2005, all pages.
Gunther et al, "Measuring Round Trip Times to determine the Distance between WLAN Nodes", Dec. 18, 2004, Technical University Berlin, all pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/dtpdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21(2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al. "Decision tree regression for soft classification of remote sensing data", Remote Sensing of Environment 97 (2005) pp. 322-336.
Yamagata, et al., "A virtual-machine based fast deployment tool for Grid execution environment, " Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto,

(56) References Cited

OTHER PUBLICATIONS

HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, mailed Oct. 12, 2011 in 11 pages.
Supplementary European Search Report in Application No. 09727694.3 mailed Jan. 30, 2012 in 6 pages.
Singapore Examination Report in Application No. 201006837-7 mailed Mar. 16, 2012.
First Office Action in Chinese Application No. 200980111426.1 mailed Feb. 16, 2013.
Second Office Action in Chinese Application No. 200980111426.1 mailed Dec. 25, 2013.
Third Office Action in Chinese Application No. 200980111426.1 mailed Jul. 7, 2014.
Fourth Office Action in Chinese Application No. 200980111426.1 mailed Jan. 15, 2015.
Fifth Office Action in Chinese Application No. 200980111426.1 mailed Aug. 14, 2015.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, mailed Oct. 12, 2011 in 10 pages.
First Office Action in Japanese Application No. 2011-502140 mailed Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report for European Application No. 09839809.2 dated May 11, 2015.
Supplementary European Search Report in Application No. 09728756.9 mailed Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 mailed on Oct. 12, 2011.
First Office Action is Chinese Application No. 200980125551.8 mailed Jul. 4, 2012.
First Office Action in Japanese Application No. 2011-516466 mailed Mar. 6, 2013.
Second Office Action in Japanese Application No. 2011-516466 mailed Mar. 17, 2014.
Decision of Refusal in Japanese Application No. 2011-516466 mailed Jan. 16, 2015.
Office Action in Canadian Application No. 2726915 dated May 13, 2013.
First Office Action in Korean Application No. 10-2011-7002461 mailed May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Search Report and Written Opinion in Singapore Application No. 201103333-9 mailed Nov. 19, 2012.
Examination Report in Singapore Application No. 201103333-9 dated Aug. 13, 2013.
International Search Report and Written Opinion in PCT/US2011/053302 mailed Nov. 28, 2011 in 11 pages.
International Preliminary Report on Patentability in PCT/US2011/053302 mailed Apr. 2, 2013.
First Office Action in Japanese Application No. 2013-529454 mailed Feb. 3, 2014 in 6 pages.
Office Action in Japanese Application No. 2013-529454 mailed Mar. 9, 2015 in 8 pages.
First Office Action issued in Australian Application No. 2011307319 mailed Mar. 6, 2014 in 5 pages.
Search Report and Written Opinion in Singapore Application No. 201301573-0 mailed Jul. 1, 2014.
First Office Action in Chinese Application No. 201180046104.0 mailed Nov. 3, 2014.
Examination Report in Singapore Application No. 201301573-0 mailed Dec. 22, 2014.
International Preliminary Report on Patentability in PCT/US2011/061486 mailed May 22, 2013.
International Search Report and Written Opinion in PCT/US2011/061486 mailed Mar. 30, 2012 in 11 pages.
First Office Action in Chinese Application No. 201180053405.6 dated May 3, 2015.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 mailed Jul. 18, 2008 in 11 pages.
International Preliminary Report on Patentability in PCT/US2007/007601 mailed Sep. 30, 2008 in 8 pages.
Supplementary European Search Report in Application No. 07754164.7 mailed Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 mailed Dec. 11, 2012 in 26 pages.
Office Action in Japanese Application No. 2013-123086 mailed Apr. 15, 2014 in 3 pages.
Office Action in Japanese Application No. 2013-123086 mailed Dec. 2, 2014 in 2 pages.
Sharif et al, "Secure In-VM Monitoring Using Hardware Virtualization", Microsoft, Oct. 2009 http://research.microsoft.com/pubs/153179/sim-ccs09.pdf; 11 pages.
Second Office Action in Chinese Application No. 201180053405.6 dated Dec. 4, 2015.
Office Action in European Application No. 07754164.7 dated Dec. 14, 2015.
Guo, F., Understanding Memory Resource Management in Vmware vSphere 5.0, Vmware, 2011, pp. 1-29.
Office Action in European Application No. 09839809.2 dated Dec. 8, 2016.
Office Action in Canadian Application No. 2816612 dated Oct. 7, 2016.
Cricket Liu, "The Ultimate Guide to Preventing DNS-based DDoS Attacks", Retrieved from http://www.Infoworld.com/article/2612835/security/the-ultimate-guide-to-preventing-dns-based-ddos-attacks.html, Published Oct. 30, 2013.
Steve Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.

(56) References Cited

OTHER PUBLICATIONS

U.S. Appl. No. 14/815,863, Identifying Targets of Network Attacks, filed Jul. 31, 2015.
U.S. Appl. No. 14/815,843, Identifying Targets of Network Attacks, filed Jul. 31, 2015.
U.S. Appl. No. 14/864,684, Identifying Sources of Network Attacks, filed Sep. 24, 2015.
U.S. Appl. No. 14/864,638, Mitigating Network Attacks, filed Sep. 24, 2015.

* cited by examiner

MITIGATING NETWORK ATTACKS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ a series of interconnected data centers to deliver content (such as web sites, web content, or other digital data) to users or clients. These interconnected data centers are sometimes referred to as "content delivery networks" (CDNs) or content delivery systems. Existing routing and addressing technologies can enable multiple data centers associated with a content delivery system to provide similar or identical content to client computing devices. In some instances, each data center providing a set of content may be referred to as a point-of-presence ("POP"). A content delivery system can maintain POPs over a wide area (or worldwide) to enable the system to efficiently service requests from clients in a variety of locations.

Malicious entities occasionally attempt to disrupt the operations of service providers or content creators via network-based attacks ("network attacks"). One mechanism for doing so is a "denial of service" (DoS) attack. These attacks generally attempt to make a target computing device or network resource, such as a web site, unavailable to legitimate clients. One common instance of a DoS attack involves saturating the target device or network with external communications requests, such that it cannot respond to legitimate traffic, or it responds so slowly as to be rendered effectively unavailable. Because of the number of requests required to mount such an attack, responsibility for implementing the attack is often distributed across many computing devices. These distributed attacks are therefore known as "distributed denial of service" (DDoS) attacks. Because attacked targets, such as specific web sites or domain names, are often hosted or associated with a content delivery system, that system itself may also be targeted by the attack. Further, the content delivery system often hosts content on behalf of non-targeted systems or networks, which may also be affected by the attack due to their use of the content delivery system.

DETAILED DESCRIPTION

Figure 1:
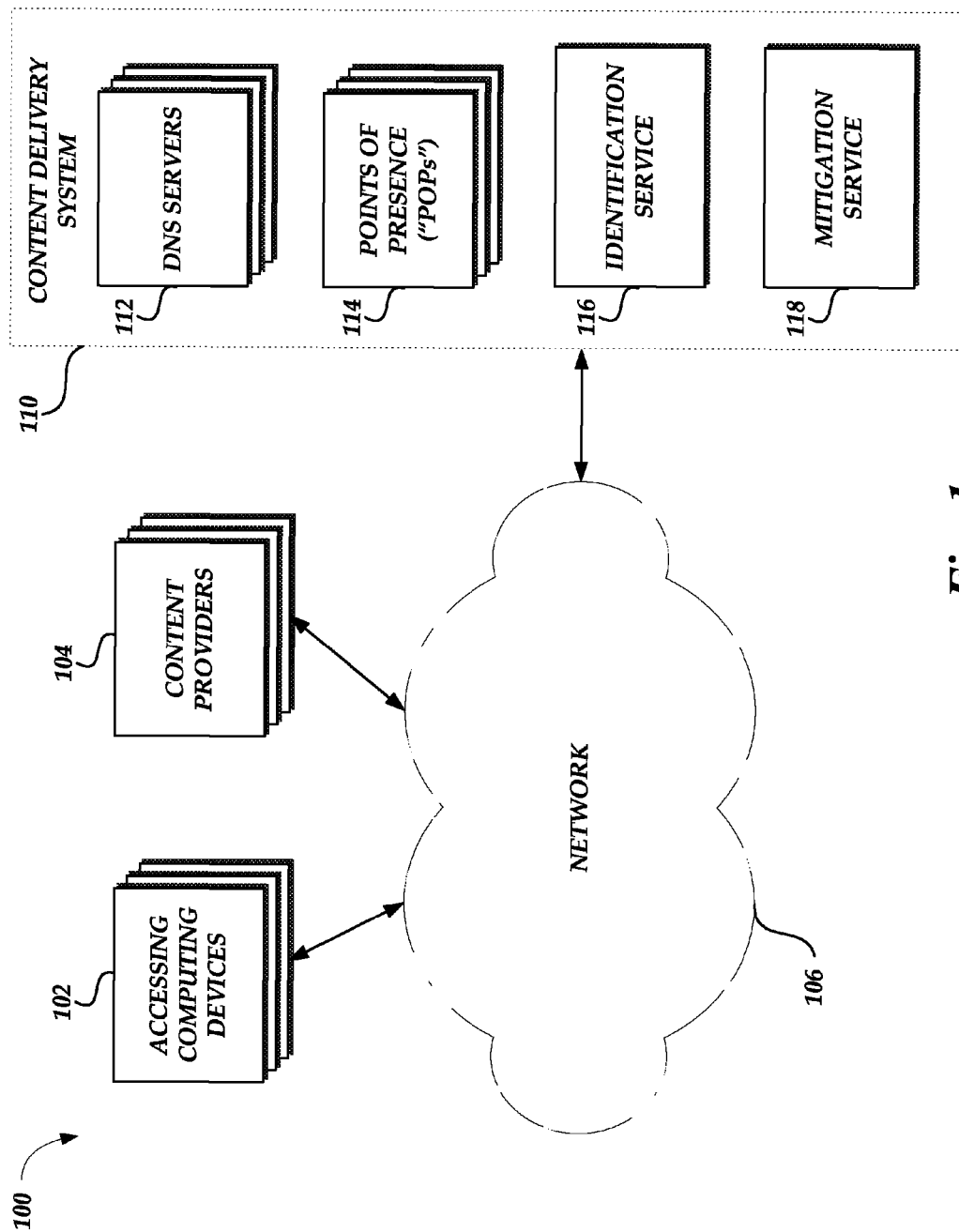
FIG. 1 is a block diagram depicting an illustrative logical network 100 including multiple accessing computing devices 102 and content providers 104, as well as a content delivery system 110 including multiple points-of-presence 114.

Generally described, aspects of the present disclosure relate to identifying the targets and sources (e.g., attackers) of a network attack, such as a denial of service ("DoS") attack directed towards a content delivery system, by use of unique or semi-unique combinations of network addressing information. Specifically, aspects of the present disclosure enable each potential target or source of network attacks to be assigned to a unique or semi-unique set of network addressing information used to access content on a content delivery system. Thereafter, when an attack is detected on the content delivery system, the specific network addressing information utilized in the attack can be compared to those combinations assigned in order to identify potential sources of the attacks, targets of the attacks, or both. Thereafter, the content delivery system may mitigate the attack based on the identified attack source or target.

Embodiments of the present disclosure may be beneficial, for example, when implemented on a content delivery system hosting content of a multitude of potential targets. In such instances, a potential target on a content delivery system may correspond to a specific set of content hosted by the content delivery system on behalf of a third-party content provider or an operator of the content distribution service itself. Such a set of content can be generally referred to as a "distribution," and may correspond to a specific web site (e.g., as associated with a specific domain name) or other network-accessible service. Content delivery systems generally make distributions available at one or more network addresses (e.g., internet protocol or "IP" addresses), to which a computing device—either legitimate or malicious—may transmit a request for information. However, due to the limited nature of network address formats, it may be impossible or infeasible to uniquely assign network addresses to individual distributions. Thus, it may be difficult or impossible to determine, based on the network address to which a network attack is directed, which distribution sharing a given network address is the target of the attack. This, in turn, may limit the potential mitigation techniques available to the content delivery system. Accordingly, embodiments of the present disclosure enable a content delivery system to associate a unique or semi-unique combination of network addresses (e.g., internet protocol or "IP" addresses) with each distribution. Thereafter, a network attack directed to a combination of network addresses that is unique to a specific distribution can be quickly determined to be targeting that distribution, which can aid in mitigation of the attack. In the context of the present application, "unique" combinations of network addresses refer to combinations of network addresses that can be used to specifically identify a distribution assigned to that unique combination of network addresses, or that can be used to identify a distribution assigned to that unique combination of network addresses with a degree of statistical certainty over a threshold level.

Embodiments of the present application further enable a targeted distribution to be identified even when an attack is directed to less than an entire combination of network addresses shared by multiple distributions. For example, assuming that distributions are assigned unique combinations of four network addresses, embodiments of the application can enable a distribution subject to attack to be identified even when the attack targets only two network addresses (which may be shared with non-attacked distributions). As will be described below, a content delivery system may respond to such an attack by limiting the network availability of attacked network addresses. For example, a content delivery system may halt advertisement of an attacked network address within domain name system (DNS) queries, or may halt all processing of network traffic directed to an attacked address. Limiting the availability of attacked addresses can both serve to mitigate the attack, and cause the attack (should it proceed) to target additional network addresses of a target distribution. The content delivery system may then utilize the additional network addresses, in conjunction with the previously attacked network addresses, to identify the attacked distribution. Accordingly, the content delivery system may implement mitigation techniques to both limit the effects of the attack on the attacked distribution, as well as to ensure the continued availability of non-attacked distributions.

In one embodiment, unique combinations of network addresses may be assigned to each distribution based on a hashing algorithm, in connection with information regarding the distribution. For example, where each distribution is to be associated with a set of eight network addresses, each network address can be determined based on hashing a combination of the distribution's human-readable network identifier (e.g., a "domain name") and the index of the desired network address (e.g., zero through seven). In some instances, the unique network addresses assigned to a distribution may vary across different POPs of the content delivery system. As such, each network address for a given distribution can be based on hashing a combination of the distributions human-readable network identifier, the index of the desired network address, and an identifier of the POP (e.g., as assigned by the content delivery system). In some embodiments, network addresses assigned to a distribution can be caused to vary based on time by including a time value (e.g., a current date) within the hash algorithm. One example of a hashing algorithm that may be used in accordance with the present disclosure is the MD5 message-digest algorithm, which is a cryptographic hash function that produces a 128 bit hash value as an output. Various additional examples of hashing algorithms themselves are well known in the art, and therefore will not be discussed in detail herein.

Because the values produced by hashing algorithms are generally larger than the number of network addresses available to a content delivery system (or specific POPs within a content delivery system), the hash values may be reduced to produce values within a range suitable to the content delivery system. For example, a content distribution system may determine the result of a modulo operation dividing each hash value by the number of network addresses available to the content delivery system (or a specific POP within the content delivery system). The result of the modulo operation can then indicate the index of a specific network address, from a collection of available network address, that corresponds to the hash value. For example, assume a content delivery system (or POP within the system) has 256 network addresses available, and wishes to assign eight network addresses to each served distribution. The content delivery system may calculate eight hashes for each served distribution and determine the result of a modulo operation dividing each hash by 256, resulting in eight values each between zero and 255. This process would result in over four hundred trillion potential combinations of values, ensuring that each combination of eight network addresses is either unique or substantially unique.

After assigning a combination of network addresses to each distribution, the content delivery system can monitor for attacks, such as denial of service attacks, on the content delivery system. Due to the nature of such attacks, it is often trivial to determine the network addresses targeted by an attack but difficult to determine the targeted distribution. Specifically, a single network address (e.g., IP address) may serve content associated with distributions, each associated with a different human-readable network identifier (e.g., domain name or universal resource identifier [URI]). During an attack, resolution of a network address from a network identifier (e.g., via the well-known DNS resolution process) may occur separately from—and often less frequently than—actual implementation of the attack on the network address. Moreover, the packets that form a part of the attack, which are generally specially created by an attacker, often do not specify the network identifier to which the attack is targeted. Thus, when an attack on a specific network address occurs, a content delivery system may be generally unable to directly determine which distribution associated with that specific network address is actually under attack.

In accordance with aspects of the present disclosure, when an attack on a network address is detected, a content delivery system may attempt to do a "reverse lookup" of the attacked distribution, by utilizing a similar algorithm to that described above with respect to assignment of network addresses. Specifically, an identification service within the content delivery system may generate or obtain a listing of each distribution potentially targeted by the attack (e.g., each distribution on a specific POP under attack), and what combination of network addresses has been assigned to the distribution by the content delivery system. In some embodiments, this listing may be generated "on-the-fly" by the identification service, by calculating a combination of network addresses for each distribution (as described above) in response to a request to resolve a network address into a corresponding distribution. In other embodiments, the identification service may pre-compute a mapping of distributions and associated network address combinations using the hash-based calculation described above. In either instance, the identification service can utilize the submitted network addresses to determine which of the hosted distributions are assigned to the submitted combination of network addresses. In the instance that a small number of distributions (e.g., at or below a specified threshold value, which may be one) are assigned to the submitted network addresses, the identification service can identify those distributions. The content delivery system may then implement mitigation techniques to limit the effect of the attack on either or both of the attacked distribution or the content delivery system as a whole.

In the instance that a larger number of distributions (e.g., over a threshold value) are assigned to network addresses submitted to the identification service, the service may attempt to limit access to the submitted network addresses in an attempt to either halt the attack or force the attack to move to additional network addresses. In one embodiment, the identification service may instruct DNS servers associated with the content delivery system to remove the initially submitted network addresses (e.g., those currently under attack) from DNS service responses. Because client computing devices generally access distributions by first submitting a DNS request for the distribution, removing attacked network addresses from DNS service records may cause legitimate clients to attempt to connect to alternate network addresses, at least partially mitigating the attack.

In addition to removing attacked addresses from DNS record responses, the content delivery system 110 may also halt processing traffic directed to attacked addresses. Such halting is sometimes referred to as "blackholing" the network address, and generally involves discarding or "dropping" packets addressed to the network address, either at a receiving computing device or at an intermediary network device. This technique may be especially desirable during a denial of service attack, since intermediary network devices within the content delivery system (e.g., "edge devices") may be able to process and discard packets that would otherwise overwhelm the resources of an attacked target.

In many instances, an attack on a distribution may continue even after access to the previously attacked network addresses has been limited (e.g., by removing the previously attacked network addresses from DNS responses or by "blackholing" the previously attacked network addresses). For example, an attacker may detect that the initial attack has been mitigated, and redirect the attack to additional network addresses associated with the distribution (which may be determined via DNS requests transmitted to the content delivery system either before or after limiting access to the previously attacked network addresses). Though continuation of the attack in undesirable, the content delivery system may utilize the additional network addresses to more specifically determine the distribution to which the attack is targeted. Specifically, the content delivery system may provide the additional network addresses to the identification service, and request that the identification service utilize the additional network addresses in conjunction with the initially attacked (and subsequently limited) network addresses to determine a distribution that is the target of the attack.

If this combination of network addresses is associated with a single distribution (or less than a predetermined threshold number of distributions), the content delivery system may implement mitigation techniques to mitigate the attack on that distribution. Alternatively, the content delivery system may continue to limit the availability of attacked network addresses until a single distribution (or less than a threshold number of distributions) has been identified as the target of the attack.

While examples are provided herein with respect to content distribution systems, embodiments of the present application may be implemented with respect to any network of computing devices that operates to serve discrete sets of content to client computing devices. Moreover, while some examples are provided with respect to a content distribution network as a whole, embodiments of the present application may also be implemented in whole or in part by discrete portions of the content delivery system. For example, each POP within a content delivery system may function to assign a unique or semi-unique combination of network addresses to the content of a distribution that is hosted at that POP, which may vary from the network addresses assigned to the same content of the distribution at a different POP. As a further example, each POP within a content delivery system may include an identification service configured to identify an attacked distribution or computing devices associated with a network attack based on a combination of attacked network addresses. Thus, the examples provided herein are intended to be illustrative, and not exhaustive, in nature.

Further, while examples are provided herein utilizing a combination of network addresses (such as IP addresses) to uniquely identify a distribution, embodiments of the present application may additionally or alternatively assign to distributions a unique (or statistically likely to be unique) set of other addressing information. As used herein, addressing information includes any information provided by an accessing computing device to connect to a service provided by the content distribution system. By way of non-limiting example, sets of addressing information may include a network address, port number, or transmission protocol. Illustratively, each distribution on the content distribution service may be assigned eight network address and port number pairs. Thereafter, a network attack directed at some number of address and port number pairs could be compared to those address and port number pairs assigned to each distribution to identify a target of the attack. Similarly, each distribution on the content distribution service may be assigned some n number of sets of addressing information composed of a network address, port, and protocol. Because the number of unique sets of addressing information is much larger than the number of unique network addresses, use of sets of addressing information may enable the content distribution service to uniquely identify specific sets of content (or other services) using smaller combinations of addressing information.

In addition, embodiments of the present application may be used to identify sources of network attacks. Attackers often include forged information within the data packets used to implement a network attack, such as a false source IP address. Thus, identification of an attacker from the data packets that form a part of an attack is often difficult or impossible. However, attackers are more likely to provide legitimate source address information when resolving a domain name (or other human-readable identifier) of an attack target into network addresses (or addressing information sets) at which the attack target can be accessed. In some cases, attackers are required by technical limitations to provide legitimate source address information in connection with domain name resolution requests, as providing a forged source address would result in a response to the request being sent to that forged source address and never reaching the attacker. Accordingly, aspects of the present disclosure enable the source address information (or other identifying information) provided by attackers during a name resolution request to be matched to later network attacks.

Specifically, when a client computing device—either legitimate or illegitimate—requests resolution of a domain name (or other identifier) of a set of content, that client computing device can be provided with a unique or semi-unique combination of network addresses (or addressing information sets) at which to access the set of content. Thereafter, any network attack directed to that combination of network addresses (or addressing information sets) can be attributed to the client computing device. By using combinations of network addresses, the content delivery system is not required to provide a unique network address to each client computing device. As such, a relatively large number of client computing devices may be provided with unique or semi-unique combinations of network addresses, from a relatively small pool of available network addresses. After identifying the source or target of an attack, the content delivery system may implement an appropriate mitigation technique. For example, where the source of an attack is identified, the content delivery system may cease to service requests originating from the source, or may handle requests originating from the source in a different manner (e.g., by redirecting those request to an alternate location separate from a location servicing legitimate access requests). As a further example, where the target of an attack is identified, such as a specific distribution, the content delivery system may modify an internal or external network configuration to cause access to the distribution on the content delivery system to be changed. For example, the content delivery system may halt providing access to the distribution via an original POP, and begin providing access to the distribution via an alternative POP, such as a POP with greater access to network resources or a POP implementing DDOS protection mechanisms or techniques. Illustratively, each POP within a content delivery system may be configured to service requests for any of a plurality of sets of content provided by the content delivery system. Thus, providing access to a distribution via an alternative POP may simply require the content delivery system to redirect requests to access the content to that alternative POP. As a further example, the content delivery system may increase the number of POPs providing access to the distribution (e.g., by utilizing anycast techniques, which are known in the art, to advertise access to network addresses of the distribution from multiple POPs). As yet another example, the content delivery system may modify network devices (e.g., routers) within the content delivery system, such that requests to access the distribution are routed over specific physical ports of those routers. Because routers are generally limited in the number of data packets that can be processed on any specific physical port, controlling the physical ports used to transfer requests associated with an distribution under attack may enable the content delivery system to reduce the impact of an attack to other physical ports (e.g., servicing other distributions).

While examples are described above with respect to modifying access on the content delivery system to a distribution that is under attack, the content delivery system may additionally or alternatively modify access to other distributions affected by an attack, such as other distributions sharing one or more network addresses with an attacked distribution. As discussed above, the limited nature of many network address formats may cause the content distribution system to provide access to multiple distributions via any single network address. Because network attacks generally target these network addresses generally, an attack against a first distribution on a network address may also affect other distributions on that network address. As such, when a distribution targeted in an attack has been identified on the content delivery system, the content delivery system may also modify access to other, non-attacked distributions to reduce or eliminate the effect of the attack on those distributions. For example, the content distribution system may modify an internal or external network configuration to ensure that non-targeted distributions that previous utilized attacked network addresses will subsequently utilize a new set of non-attacked network addresses. In some such embodiments, the content delivery system may modify network configurations to ensure that attacked network addresses are utilized only by an attacked distribution. Thus, modifying access to non-attacked distributions may serve to limit the overall effect of the network attack, even when the content distribution system is unable to prevent the attack from effecting the operation of the distribution that is under attack.

In some instances, the specific network modifications utilized to implement the above-described mitigations may depend at least in part on whether a network attack is or is not a "re-resolving" attack. Re-resolving attacks may generally be characterized by the repeated use of resolution requests (such as DNS requests) throughout the attack, such that the attack may "adapt" to target new network addresses when a resolution record for an attacked distribution is changed. An attack that is not re-resolving may generally be characterized by a lack of repeated resolution requests, such that the attack continues to target an initial set of network addresses even after resolution records of a distribution are modified to include an alternative set of network addresses.

In the instance that an attack is re-resolving, the content delivery system may redirect the attack by modifying resolution records of one or more affected distribution. For example, the content delivery system may modify DNS records of an attacked distribution to include one or more alternative network addresses (e.g., associated with a POP executing DDoS protection mechanisms, associated with multiple POPs via anycast, etc.), while also modifying the DNS records of affected, non-attacked distributions to include other network addresses, thus separating the non-attacked and attacked distributions.

In instances where an attack is not re-resolving, the content delivery system may redirect the attack by modifying the routing of data packets addressed to attacked network addresses. For example, the content delivery system may "blackhole" one or more attacked addresses by instructing routing devices within the content delivery system 110 to discard (or "drop") packets directed to the attacked addresses, or may "tarpit" one or more attacked addresses by instructing routing devices within the content delivery system 110 to delay processing of packets directed to the attacked addresses. As a further example, the content delivery system may generate and transmit routing protocol data, such as Border Gateway Protocol ("BGP") packets, to cause routers either within or external to the content distribution system to modify how data addressed to attacked network devices is routed. Illustratively, assume that an attack that is not re-resolving is initiated against a specific network address associated with an initial POP, and that the content delivery system is programmed to attempt to mitigate the attack by redirecting the attack to an alternative POP (such as one executing DDoS protection software). Because the attack is not re-resolving, modifications to resolution records, such as DNS records, will not affect the attack.

Thus, in order to redirect the attack to an alternative POP, the content delivery system may transmit routing update packets to routing devices associated with the POP (either under control of the content delivery system or under the control of third parties) which indicate that the attacked network addresses is associated with the alternative, and not the initial, POP. For example, the content delivery system may instruct the initial POP (or routers associated with the initial POP) to transmit "withdraw" packets to connected network devices, indicating that the attacked network addresses are no longer accessible at the initial POP. The content delivery system may also instruct the alternative POP to transmit advertisement packets to connected network devices, indicating that the attacked network addresses are accessible at the alternative POP. These routing updates may then be propagated in accordance with their underlying protocol to cause packets destined for to the attacked network addresses to be routed to the alternative POP. Thus, the content delivery system may modify how data of an attack is routed, even when the attack is not re-resolving.

As will be appreciated by one of skill in the art in light of the description above, the embodiments disclosed herein substantially increase the ability of computing systems, such as content delivery systems, to identity and mitigate network attacks on specific sets of content, such as a web site or domain name. Thus, the presently disclosed embodiments represent an improvement in the functioning of such computing systems, by enabling content delivery systems or other networked devices to continue to service legitimate client requests even while receiving large numbers of illegitimate requests. Moreover, the presently disclosed embodiments address technical problems inherent within computing systems; specifically, the limited ability of computing systems to process network-based requests, the limited number of network addresses available to computing systems, and the ambiguity in network addresses that results from providing content of multiple domain names from a single network address. These technical problems are addressed by the various technical solutions described herein, including the assignment and distribution of unique network address combinations for specific collections of content (e.g., individual distributions, network identifiers or domain names), the resolution of attacked network addresses to attack content, and the disambiguation of attacks directed to a non-unique combination of network addresses by iteratively limiting access to those attacked network addresses until a unique or semi-unique combination of network addresses is identified. Thus, the present application represents a substantial improvement on existing network systems and computing systems in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network 100 including multiple accessing computing devices 102 and multiple content providers 104 in communication with a content delivery system 110 via a network 106. While the accessing computing devices 102 and the content providers 104 are shown as a group within FIG. 1, the accessing computing devices 102 and content providers 104 may be geographically distant, and independently owned or operated. For example, the accessing computing devices 102 could represent a multitude of users in various global, continental, or regional locations accessing the content delivery system 110. Further, the content providers 104 could represent a multitude of related or distinct parties that have associated with the content delivery system 110 to provide content, such as web sites, multimedia, or other digital, network-deliverable content to the accessing computing devices 102. Accordingly, the groupings of accessing computing devices 102 and content providers 104 within FIG. 1 is intended to represent a logical, rather than physical, grouping. Similarly, each of the components of the content delivery system 110 may be located within geographically diverse areas. For example, the DNS servers 112 and POPS 114 within the content delivery system may be globally, continentally, or regionally disparate, in order to provide a wide geographical presence for the content delivery system 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the accessing computing devices 102, content providers 104, and content delivery system 110 is depicted as having a single connection to the network 106, individual components of the accessing computing devices 102, content providers 104, and content delivery system 110 may be connected to the network 106 at disparate points. Accordingly, communication times and capabilities may vary between the components of FIG. 1.

Accessing computing devices 102 may include any number of different computing devices capable of communicating with the content delivery system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Further, accessing computing devices 102 may include devices utilized by both legitimate clients of the content delivery system 110 and devices utilized by malicious parties to undertake network-based attacks, such as DoS attacks, on the content delivery system 110. Accessing computing devices 102 may generally be identified on the network 106 by use of a computing device identifier, such as a media access control (MAC) address or IP address.

Content providers 104 may include any computing device owned or operated by an entity that has provided content to the content delivery system 110 for subsequent transmission to client computing devices (which may include one or more accessing computing devices 102). For example, content providers 104 may include servers hosting web sites, streaming audio, video, or multimedia services, data analytics services, or other network-accessible services. While illustratively shown in FIG. 1 as a network-attached computing device, content providers 104 may additionally or alternatively provide content to the content delivery system 110 via non-networked communication channels (e.g., via physical delivery of data).

The content provided to the content delivery system 110 by the content providers 104 may be hosted in POPs 114. Each POP 114 may include a variety of computing devices configured to serve content to accessing computing devices 102. Accordingly, though not shown in FIG. 1, each POP 114 may include any number of processors, data stores, or networking components operating in conjunction to facilitate retrieval of content. Each POP 114 may be associated with a limited number of network addresses via which accessing computing devices 102 may address the POP 114 via the network 110. In one embodiment, each network address is an internet protocol version 4 (IPv4) or internet protocol version 6 (IPv6) address. For example, each POP 114 may be associated with one or more specific "blocks" of network addresses, such as the "192.168.0.0/24" block of IPv4 addresses (represented in classless inter-domain routing or "CIDR" notation, as is common in the art). Further, each POP 114 may be configured to provide multiple sets of content, each of which may be associated with a specific content provider 104. Generally, these discrete sets of content may be referred to herein as a "distribution." Each distribution may represent a specific network-accessible service available from the POP 114 or the content delivery system 110 generally.

Because the number of distributions provided by a POP 114 can exceed the number of network addresses available to the POP 114, each distribution may be available at multiple network addresses. For example, a first network address "192.168.0.1" may service requests directed to the distributions "www.domain1.tld" and "www.domain2.tld," while a second network address "192.168.0.2" may service requests directed to the distributions "www.domain3.tld" and "www.domain4.tld." Each of these illustrative distributions may correspond to a distinct content provider 104. One of ordinary skill in the art will recognize that the example network addresses and identifiers provided herein are illustrative in nature, and not intended to refer to any specific existing network address or identifier.

Each network address within a POP 114 may further be assigned to multiple computing devices (not separately shown in FIG. 1). Existing routing technologies, as are well known within the art, can enable the multiple computing devices to balance the load of requests directed to a specific network address. By varying the number of computing devices assigned to a given network address, as well as the combination of network addresses assigned to specific distributions, the capabilities of each POP 114 may be scaled to address virtually any number of accessing computing devices 102.

The illustrative content delivery system 110 of FIG. 1 further includes a set of DNS servers 112 configured to resolve human-readable network identifiers of distributions (such as domain names or URIs) into network addresses (such as IP addresses) or addressing information sets (composed of addressing information, such as network address, port numbers, protocols, or combinations thereof) at which content of the distributions may be obtained. Illustratively, each DNS server 112 may include one or more processors, memories, and data storage devices collectively configured to receive requests from accessing computing devices 102 for a specific domain name associated with a distribution. The DNS servers 112 may further be configured, in response, to provide a combination of network addresses, associated with one or more computing devices within a POP 114, at which content of that distribution may be obtained. Thereafter, the accessing computing device 114 may communicate with the POP 114, via the combination of network addresses, to access the distribution. The specific operation of DNS servers 112 to receive and resolve requests for network addresses is well known within the art, and thus will not be described in detail herein.

In accordance with embodiments of the present disclosure, each DNS server 112 may be configured to distribute a specific combination of network addresses (or addressing information sets) for individual distributions, which network addresses (or addressing information sets) are selected such that there is a high statistical probability of the combination of network addresses uniquely identifying the individual distribution. In one embodiment, each DNS server 112 may select an integer n number of network addresses from a pool of k available network addresses, such that the total possible unique combinations of network addresses may be represented as the equation:

$$\frac{k!}{n!(k-n)!}$$

The value k (representing a number of network addresses within a pool of network addresses available to a distribution on the content delivery system 110 or a specific POP 114 of the content delivery system 110) may be selected by an operator of the content delivery system 110 based on the number of network addresses assigned to the system 110, the number of network addresses utilized for other tasks within the system 110, etc. The value n may be selected by an operator of the content delivery system 110 accordingly to multiple criteria, including but not limited to: ensuring that a sufficient number n of network addresses is assigned to a distribution to ensure availability of the distribution in the case of network failure or congestion; ensuring that a sufficient number of combinations (derived according to the formula above) for the value n exist, such that each distribution is statistically likely to be provided with a unique combination of network addresses; and reducing the proportion of the n network addresses needed to unique identify a distribution under attack. In one embodiment, n is equal to eight, while k is at least 128. While the values of n and k may be modified to address the needs of the content delivery system 110 (or a specific POP 114 within the content delivery system 110), the value of k is generally expected to exceed that of n, such that there is a high probability that an individual distribution can be uniquely identified by n network addresses.

To attribute network addresses to an individual distribution, the DNS servers 112 may maintain a list of available network addresses within an address pool, each associated with an index (e.g., of 0 through k−1). Each index may identify a "slot" associated with a specific network address that can be assigned to a distribution. For example, an index '1' may be associated with the IPv4 address "192.168.0.1," while the index '2' may be associated with the IPv4 address "192.168.0.2." In some instances, the list of available addresses may be configured such that the index of each address is equal to the final segment of the network address (e.g., index '1' is associated with network address "192.168.0.1," etc.). In other instances, the index of each address may be unrelated to the actual network address (e.g., index '1 may be associated with '192.168.0.5', or any arbitrary address available to the content delivery system 110). While examples provided herein utilize the same three initial octets "192.168.0," network addresses available to the DNS servers 112 may include any network address representable within a network address format used by the DNS servers 112 (e.g., IPv4, IPv6, etc.). Given a list of k addresses, each DNS server 112 may determine the indexes of network addresses to assign to a distribution according to the equation $$i = h(D+x) \bmod k$$

where i represents the index of each network address within the list of network addresses, the function h( ) represents any of a number of widely known hashing functions (such as the MD5 hashing function), D represents an identifier of other information uniquely describing the distribution (e.g., a domain name), and x represents the specific network address 1 through n from the n network addresses to be assigned to the distribution. Though not shown in the equation above, DNS servers 114 may include additional information into the hashing function h( ). For example, where a distribution is assigned a unique combination of network addresses at each individual POP 114, the hashing function may include an identifier of the POP 114 for which network addresses are sought. As a further example, the hashing function may include a temporal value (such as a current date), causing the combination of network addresses associated with a distribution to vary with time. Various additional values may be included within the hashing and are contemplated within the scope of the present disclosure. By utilizing the equation above, a DNS server 114 may determine a combination of network address from the list of available network addresses, and associate that network address to the distribution.

As discussed above, some embodiments of the present application may identify sets of content based on combinations of sets of addressing information, rather than network addresses. In such embodiments, the value of k within the equation above may represent the number of possible sets of addressing information (e.g., the possible combinations of available network addresses, ports, protocols, or other addressing information). The content delivery system may maintain a listing of each possible set of addressing information, and assign each distribution to a combination of sets of addressing information according to the algorithm above. Because the value of k when using sets of addressing information is likely to be much larger than when using networking addresses alone, a lower value of n may be possible while still maintaining a high likelihood that the combination of sets of addressing information uniquely identifies each distribution.

While some examples are provided herein with reference to a single pool of k addresses, in some embodiments, the content delivery system 110 (or each POP 114 within the content delivery system 110) may maintain multiple network address pools, each containing a set of network addresses available for association with distributions. In some instances, each pool may be associated with a different class of distribution, such that distributions with a normal risk of being targeted by a network attack may be classes as "normal" distributions, while distributions with a high risk of being targeted by a network attack (or which are currently potentially being targeted by a network attack are class as "high risk" distributions. Accordingly, the content delivery system 110 may be configured to determine a combination of network addresses for a "normal" distribution from a list of k addresses associated with a "normal" network address pool, and to determine a combination of network addresses for a "high risk" distribution from a list of k addresses associated with a "high risk" network address pool. In one embodiment, network address pools are contiguous blocks of IP addresses (e.g., a "/24" block in CIDR notation), and the IP addresses assigned to a specific distribution from any class of network address pool may vary only in the prefix of those IP addresses. For example, a given distribution may be assigned the addresses "192.168.0.1," "192.168.0.3" and "192.168.0.19" if the distribution is classed as "normal" (where the "192.168.0/24" block of addresses is associated with "normal" distributions), and may be assigned the addresses "192.168.1.1," "192.168.1.3" and "192.168.1.19" if the distribution is classed as "high risk" (where the "192.168.1/24" block of addresses is associated with "high risk" distributions). While two classes are illustratively described herein, the content delivery system 110 may maintain any number of classes of distributions, each associated with a pool of available network addresses. In some instances, a distribution may be re-classed in response to detection of a network attack, causing the combination of network addresses associated with the distribution to change from a first combination to a second combination. As described below, the content delivery system 110 may then monitor for a continuation of the network attack directed to additional network address from the second combination, and use those additional network addresses to determine a target of the attack on the content delivery system 110.

In some embodiments, the combination of network addresses associated with a distribution (or combinations, where multiple network address pools are utilized) may be precomputed by each DNS server 112, such that service of DNS requests to resolve a distribution identifier into a corresponding combination of network addresses may be fulfilled by referencing a pre-computed mapping of distribution identifiers to network addresses. In other embodiments, each DNS server 112 may calculate the combination (or combinations) of network addresses associated to a specific distribution in real time, while servicing a request to access the specific distribution. In yet other embodiments, the DNS server 112 may maintain a pre-computed list of network addresses for recently accessed distributions (e.g., within a cache memory), but calculate network addresses for other distributions in real time. While calculation of network addresses is described herein as executed by the DNS server 112 itself, other components of the content delivery system 112 may additionally or alternatively be configured to calculate network addresses for a distribution. For example, a central server (not shown in FIG. 1) may precompute network addresses for each distribution serviced by the content delivery system 110 (or specific POP 114) and transmit the precomputed network addresses to the relevant DNS servers 112 associated with those distributions. The DNS servers 112 may thereafter service requests by accessing computing devices 102 to resolve identifiers of distributions into a corresponding combination of network addresses.

In some instances, the DNS servers 112 may additionally or alternatively distribute unique or semi-unique combinations of network addresses to the accessing computing devices 102 on a per-device basis. Illustratively, multiple accessing computing devices 102 may request to resolve a human-readable identifier of a distribution into corresponding network addresses. The DNS server 112 may generate a unique or semi-unique combination of network addresses at which each accessing computing device 102 may access the distribution as a function of an address (e.g., a MAC address or IP address) or other identifier of the computing device 102. In this embodiment, the DNS server 112 may thus select a combination of n network addresses (or network addressing sets) for each client computing device from k network addresses (or network addressing sets) at which the distribution may be accessed, based on the equation:

$$i=h(D+x) \bmod k$$

where k represents a pool of network addresses at which a distribution may be accessed, i represents an individual network address within a combination of addresses distributed to a client computing device, the function h( ) represents any of a number of widely known hashing functions (such as the MD5 hashing function), D represents an identifier of other information describing the computing device (e.g., a MAC address or IP address), and x represents the specific "slot" of network address (e.g., 1 through n) of the n network addresses to be assigned to the accessing computing device 102. In some instances, additional parameters, such as a time factor or random seed value, may be added to the equation above to further vary the network addresses distributed to a accessing computing device 102.

In instances where DNS servers 112 are configured to distribute network addresses on a per-device basis, the DNS servers 112 may further be configured to store a listing of the specific combinations of network addresses distributed to individual client computing devices 102 (e.g., with a data store of the content delivery system 110 not shown in FIG. 1) for further use by the content delivery system 110, as described below.

The content delivery system 110 further includes an identification service 116, which is configured to enable identification of a distribution based on one or more network addresses. Illustratively, the identification service 116 may be utilized during an attack on the content delivery system 110 to enable the specific distribution targeted in the attack to be identified based on network addresses to which the attack is targeted. In one embodiment, the identification service 116 is implemented centrally on the content delivery system 110, at one or more computing devices accessible throughout the content delivery system 110. In another embodiment, the identification service 116 is a distributed service hosted at various locations within the content delivery system 110 (e.g., by computing devices associated with various POPs 114).

The identification service 116 is illustratively configured to receive requests from within the content delivery system 110 (e.g., from automated attack detection systems within the content delivery system 110 or from human operators) which specify one or more attacked network addresses, and to attempt to resolve the attacked network addresses into an identifier of a distribution (e.g., a domain name). In one embodiment, the identification service 116 utilizes the same algorithm described above with respect to the DNS servers 112, to compute a mapping between each potential distribution and a combination (or combinations) of network addresses. The identification service 116 may then inspect the mapping to determine which distributions are associated with the attacked network addresses. Where the number of attacked network addresses is large with respect to n (the number of network addresses assigned to each distribution) it is statistically likely that the attacked network addresses will correspond to a single distribution. The identification service 116 may therefore return an identifier of that distribution (e.g., a domain name) to the requesting party. In some instances, the content delivery system 110 may further be configured to utilize the returned identifier to attempt to mitigate the network attack.

However, especially where the number of attacked network addresses is small with respect to n, the identification service 116 may be unable to identify the attacked distribution specifically. In some instances, specific identification of an attacked distribution may not be required. Instead, the identification service 116 may be configured to identify the attacked distribution as one among no more than a threshold number of potential distributions that match the attacked network addresses. For example, assuming a threshold number of three, the identification service 116 may be configured to identify the attacked distribution as either distribution A, B, or C, each of which may be associated with the attacked network addresses specified to the identification service 116.

Where more than a threshold number of distributions are associated with a received combination of network addresses, the identification service 116 may attempt to redirect the attack to additional network addresses. Specific interactions and functionalities for redirecting an attack to additional network addresses will be described with respect to FIG. 4 below. After an attack has been redirected to additional network addresses, the identification service 116 can utilize the additional network addresses, in conjunction with those network addresses initially received, to uniquely identify the attacked distribution. For example, where a first set of three network addresses under attack are associated with both distributions A and B, the identification service 116 may attempt to redirect the attack to an additional network address. Assuming this additional network address is associated with only distribution A, the identification service 116 may identify distribution A as the distribution under attack. If the additional network address is associated with both distribution A and B, the identification service 116 may continue to redirect the attack to additional network addresses until a unique distribution (or no more than a threshold number of distributions) can be identified. The content delivery system 110 can thereafter utilize the identification of the attacked distribution to mitigate the attack with respect to either or both the attacked distribution or the content delivery system 110 as a whole.

The identification service 116 may further be configured to enable identification of a specific accessing computing device 102 associated with a network attack. As noted above, data packets used during network attacks frequently include false information, particularly source address information, to make identification of an attack source more difficult. Accordingly, the identification service 116 may be configured to identify a computing device associated with an attack based at least in part on the specific network addresses to which the attack is directed. As described above, the content delivery system 110 may be configured to vary the combination of network addresses distributed for a distribution on a per-device basis. Accordingly, when an attack is detected at the content delivery system 110 to a set of network addresses, the identification service 116 may determine whether any combination of network addresses distributed includes that set of network addresses. If so, the accessing computing devices 102 to which those combinations of network addresses were distributed can be identified as associated with the attack (e.g., by flagging the MAC or IP address of the accessing computing device 102 as associated with the attack). In some instances, the identification service 116 may determine whether any combination of network addresses distributed includes that set of network addresses under attack by retrieving a listing of network address combinations distributed by the DNS server 112 (e.g., from a data store of the content delivery system 110), which may also identify the accessing computing devices 102 to which the combinations were distributed. In other instances, the identification service 116 may independently determine combinations of network addresses associated with accessing computing devices 102 (e.g., by calculating a combination of network addresses for each potential accessing computing device 102). In instances where the attacked network addresses corresponding to more than a threshold number of accessing computing devices 102, the identification service 116 may instruct the content delivery system 110 to redirect the network attack to additional network addresses, in accordance with embodiments of the present disclosure.

The content delivery system 110 further includes a mitigation service 118, which is configured to redirect traffic of a network attack among the POPs 114 or other components of the content delivery system 110 in order to mitigate the network attack. In one embodiment, the mitigation service 118 is implemented centrally on the content delivery system 110, at one or more computing devices accessible throughout the content delivery system 110. In another embodiment, the mitigation service 118 is a distributed service hosted at various locations within the content delivery system 110 (e.g., by computing devices associated with various POPs 114). Operation of the mitigation service 118 is described in more detail below with respect to FIGS. 6-10.

It will be appreciated by those skilled in the art that the content delivery system 110 may have fewer or greater components than are illustrated in FIG. 1. In addition, the content delivery system 110 could include various web services and/or peer-to-peer network configurations. Thus, the depiction of the content delivery system 110 in FIG. 1 should be taken as illustrative. For example, in some embodiments, components of the content delivery system 110, such as the identification service 116, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Any one or more of the DNS servers 112, the POPs 114, and identification service 116 may be embodied in a plurality of components, each executing an instance of the respective DNS servers 112, POPs 114, and identification service 116. A server or other computing component implementing any one of the DNS servers 112, POPs 114, and demand analysis service 116 may include a network interface, memory, processing unit, and computer readable medium drive, all of which may communicate which each other may way of a communication bus. The network interface may provide connectivity over the network 106 and/or other networks or computer systems. The processing unit may communicate to and from memory containing program instructions that the processing unit executes in order to operate the respective DNS servers 112, POPs 114, and demand analysis service 116. The memory may generally include RAM, ROM, other persistent and auxiliary memory, and/or any non-transitory computer-readable media.

Figure 2:
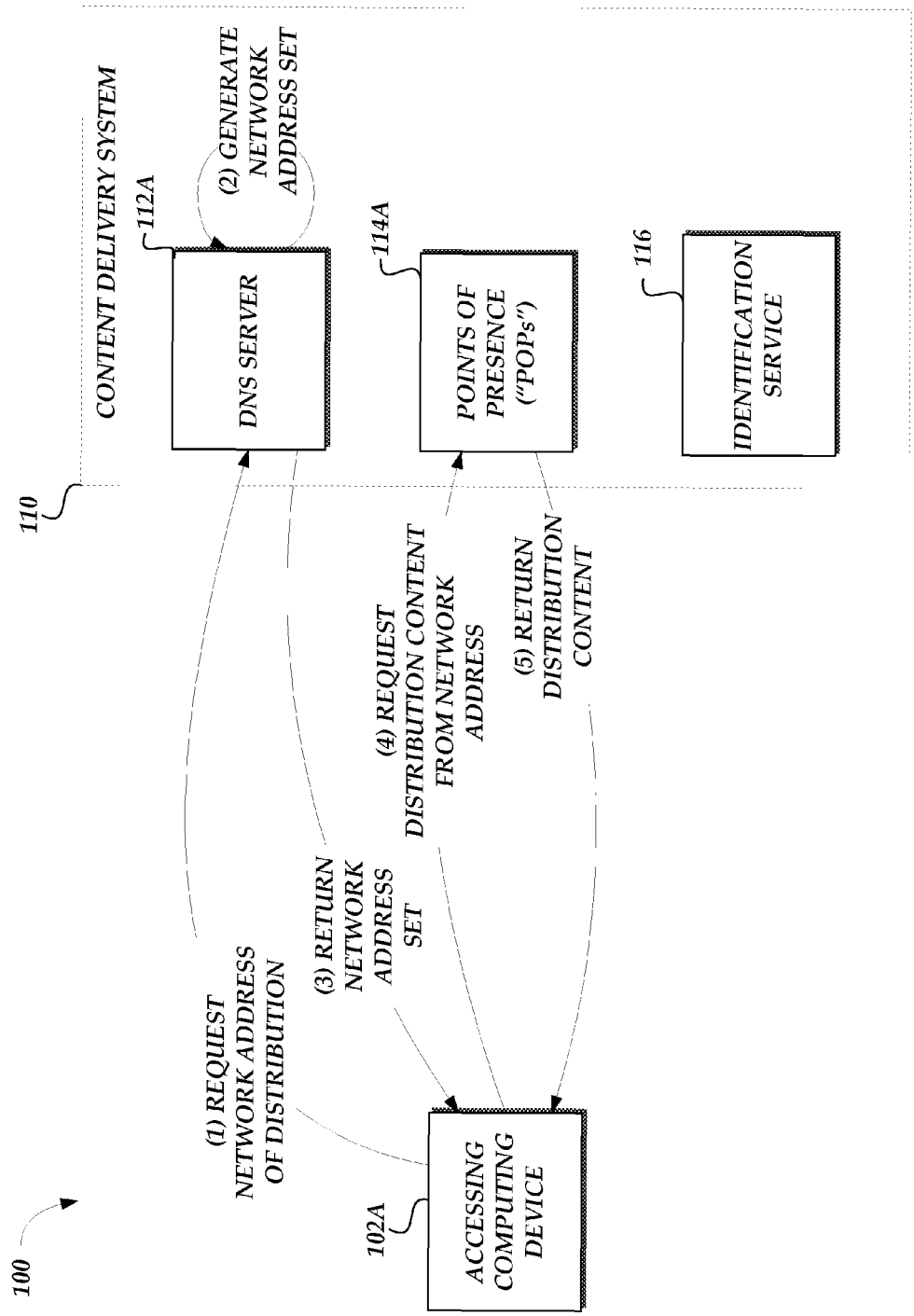
FIG. 2 is a block diagram depicting interactions between a legitimate accessing computing device 102A and the content delivery system 110 of FIG. 1 to provide content hosted by the content delivery system 110 on behalf of a content provider 104.

FIG. 2 depicts a set of illustrative interactions for enabling a client to access a distribution on the content delivery system 110 via a combination of network addresses that uniquely or semi-uniquely identify the distribution, even where a portion of such network addresses are also associated with additional distributions. As noted above, utilization of a unique or semi-unique combination of network addresses to identify a distribution on a content delivery system 110 can enable a large number of distributions to be accessible via a limited combination of network addresses, while still enabling identification of a specific distribution targeted during a network attack. While FIG. 2 depicts a single interaction between an accessing computing device 102A and the content delivery system 110, these interactions may be repeated by any number of accessing computing devices 102 in order to access content on the content delivery system 110.

The interactions of FIG. 2 begin at (1), where an accessing computing device 102A requests a network address of a distribution of content on the content delivery system 110. For the purposes of description, the accessing computing device 102A is assumed to represent a legitimate client of the content delivery system 110. As such, the request for a network address may be automatically generated by software on the accessing computing device (e.g., a web browser) in response to a user's entry of a distribution identifier (e.g., a URI or domain name associated with the distribution). In one embodiment, the request of interaction (1) is a DNS request transmitted in accordance with the well-known DNS protocol. Though not shown in FIG. 1, the communication shown in interaction (1), as well as all communication shown in the various figures, may pass through any number of intermediary communication devices. For example, the request for a network address shown in interaction (1) may be initially transmitted from the accessing computing device 102A to an intermediary DNS server (such as those commonly provided by internet service providers), which may pass the request to the DNS server 112A.

Thereafter, at (2), the DNS server 112A may generate a combination of network addresses for the distribution identified in the request. In one embodiment, such a combination of network addresses may be determined on a per-distribution basis. For example, the combination of network addresses may be generated by selecting a set of n addresses for the distribution from a list of k network addresses within a network address pool maintained by the DNS server 112A (or k possible sets of addressing information, formed from a combination of network address, port, protocol, etc.). Each network address (or set of addressing information) within the list may be assigned an index location i, and the addresses assigned to each index location associated with a given distribution may be determined according to the equation:

$$i = h(D+x) \bmod k$$

where h represents a hash function, such as the MD5 hash function; D represents data uniquely identifying the distribution, such as a domain name; and x is a value from 1 to n, representing the xth network address within the n total network addresses to be associated with the distribution. In some embodiments, additional information may be included within the hash function. For example, the combinations of network addresses assigned to a distribution may be varied with time by including a temporal factor, such as the current date, within the hash function. As a further example, where distributions are to be assigned distinct combinations of network addresses on each POP 114A, the hash function may include an identifier of the POP 114A. The specific POP 114A selected for inclusion within the function may vary based on the specific distribution techniques of the content delivery system 110. Illustratively, the DNS server 112A may determine that the request should be resolved to network addresses of a specific POP 114A based on a geographic distance, network distance, latency, or other metric quantifying a relationship between the POP 114A and the accessing computing device 102A. Moreover, the DNS server 112A may determine that the request should be resolved to network addresses of a specific POP 114A based on the current load of various POPs 114A within the content delivery system 110 or other components of the content delivery system 110. Various additional techniques and mechanisms for selection of POPs in a content delivery system are well known within the art. In some instances, additional security information (e.g., a "salt") may be added to reduce the likelihood that malicious parties can replicate the calculations achieved by the content delivery system 110.

In another embodiment, the combination of network addresses determined by the DNS server 112 may additionally or alternatively be determined on a per-device basis, such that the combination of network addresses is unique (or statistically likely to be unique) to the accessing computing device 102A. Accordingly, the algorithm listed above may be modified such that k represents a set of network addresses at which a distribution can be accessed (e.g., as determined in accordance with embodiments of the present disclosure), while D represents information unique (or substantially unique) to the accessing computing device 102A, such as a MAC or IP address. Accordingly, the DNS server 112A may determine a combination of n network addresses (or address information sets) from k network addresses (or address information sets) associated with the distribution based at least in part on hashing an identifier of the accessing computing device 102A. Thereafter, a network attack executed or instigated by the accessing computing device 102A may be identified based on the specific combination of network addresses to which the network attack is directed. In some instances, unique combinations of network addresses may be distributed on a per-device basis only for specific distributions, such as those determined to be potentially under attack in accordance with the embodiments described above.

As noted above, in some embodiments, the content delivery system 110 may utilize multiple network address pools, each associated with a class of distributions. In such embodiments, the interactions depicted at (2) may further include determining a current classification of the distribution identified in the request (e.g., as stored in one or more data stores of the content delivery system 110 not shown in FIG. 2). Thereafter, the DNS server 112A may select the n network addresses assigned to the distribution from a set of k network addresses within a pool associated with the current classification of the distribution. Thus, modifying the classification of the distribution may alter the combination of network addresses provided by the DNS server 112A for that distribution.

Generation of a combination of network addresses is illustratively described in FIG. 2 as occurring immediately in response to a request from the accessing computing device 102A. However, in some embodiments, combinations of network addresses for one or more distributions may be precomputed by the DNS server 112A, which may increase the speed at which the DNS server 112A may respond to such requests. For example, the DNS server 112A may include a cache memory (not shown in FIG. 2) that maintains a list of network addresses associated with frequently or recently accessed distributions. As a further example, the DNS server 112A may include a precomputed list of network addresses for all distributions associated with the DNS server 112A.

Thereafter, at (3), the DNS server 110 returns the generated combination of network addresses to the accessing computing device 102A. For the purposes of illustration, it is assumed that each of the returned combination of network addresses is associated with a computing device within the POP 114A. However, network addresses associated with multiple POPs 114 may be included within a single returned combination of network addresses. In one embodiment, each network address of the combination of network addresses may be included within a DNS "A record" (for IPv4 addresses) or "AAAA record" (for IPv6 addresses). The accessing computing device 102A may include software (e.g., a web browser) that automatically parses the returned information, and selects at least one network address from the combination of network addresses to which to transmit a request for content (e.g., a web page).

Thus, at (4), the accessing computing device 102A transmits a request for content, such as a web page, to a network address included within the returned combination of network addresses. This request is routed to the POP 114A, which as noted above includes a computing device associated with each network address within the returned combination of network addresses. Illustratively, the request may be a hypertext transfer protocol (HTTP) request, such as a GET request or POST request. In accordance with the HTTP protocol, the POP 114A can utilize information embedded within the request, such as a "host name" to identify a specific distribution (e.g., web site) from which content is requested.

Thereafter, the POP 114A can return the requested content to the accessing computing device 102A at (5). In this manner, a combination of network addresses may be associated each distribution of content on the content delivery system 110 to enable a large number of distributions to be served by a limited combination of network addresses, while still enabling identification of targeted distributions during a network attack.

Figure 3:
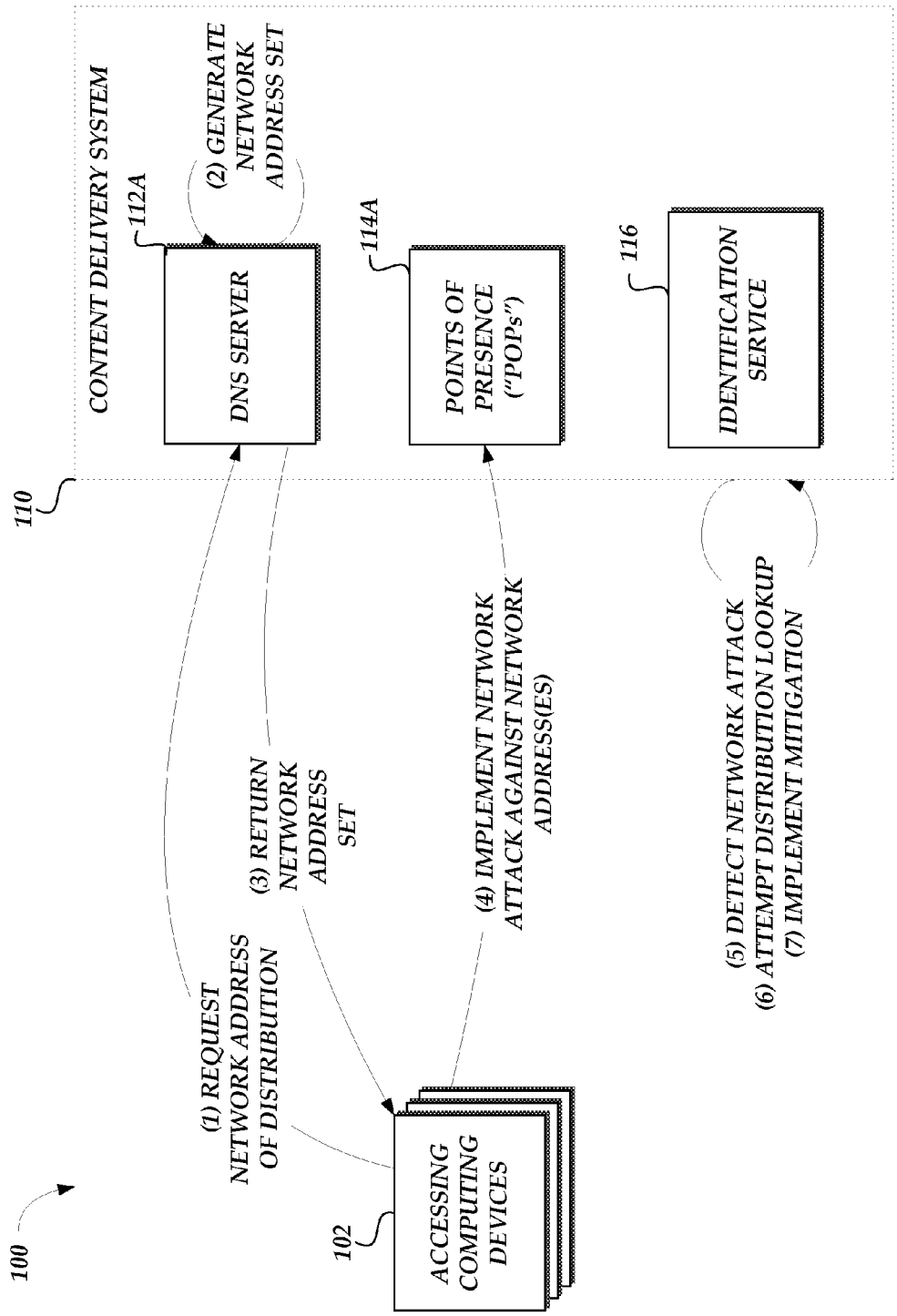
FIG. 3 is a block diagram depicting implementation of a denial of service attack on the content delivery system 110 of FIG. 1 by a set of illegitimate accessing computing devices 102 and responsive actions of the content delivery system 110, including detection of the specific content targeted in the denial of service attack or an identity of an attacker associated with the attack.

One illustrative set of interactions for identifying a targeted distribution during an attack is shown within FIG. 3. Specifically, FIG. 3 depicts a network attack, such as a DDoS attack, being executed by a set of accessing computing devices 102 against the content delivery system 110. For the purposes of FIG. 3, it is assumed that the network attack has targeted a specific distribution (e.g., a specific web site) hosted on the content delivery system 110. In order to access that targeted distribution, the accessing computing devices 102, at (1), transmit a request to the DNS server 112A for a combination of network addresses associated with the distribution. Because it may be difficult or impossible to determine that a specific resolution request was created by malicious devices, the DNS server 112A, in response to the request, generates a combination of network addresses for the targeted distribution, and returns the network addresses to the accessing computing devices 102. These interactions (labeled as (2) and (3) in FIG. 3, respectively) are similar to the interactions (2) and (3) of FIG. 2, and therefore will not be described in detail with respect to FIG. 3.

Thereafter, at (4), the accessing computing devices 102 attempt to implement a network attack against one or more of the network addresses identified by the DNS server 112A. In some instances, the accessing computing devices 102 may implement an attack against each network address identified by the DNS server 112A. In other instances, the accessing computing devices may implement an attack against only a portion of the network addresses, or only a single network address identified by the DNS server 112.

In either instance, the interactions of FIG. 3 continue at (5), where the content delivery system 110 detects the network attack. In one embodiment, the content delivery system 110 detects the network attack by monitoring network traffic transmitted to the content delivery system 110, and identifying a large volume of anomalous traffic directed to the attacked network addresses. Additional illustrative systems and methods for detecting a network attack on a network communication system are provided within U.S. Pat. No. 8,997,227, entitled "Attack Traffic Signature Generation Using Statistical Pattern Recognition," (the '227 patent) which is hereby incorporated by reference in its entirety.

Thereafter, at (6), the content delivery system 110 attempts to identify the specific distribution targeted by the network attack. As noted above, due to the limited number of network addresses available to the content delivery system 110, each attacked network address may be associated with a multitude of distributions. It may therefore be impossible to determine based on an individual network address which distribution is the target of an attack. Moreover, because data transmitted as part of a network attack is often malformed, it may be impossible or impractical to identify an attacked distribution by inspecting data packets transmitted as part of the attack.

However, because each distribution has been associated with a unique combination of network addresses, the content delivery system 110 may utilize the identification service 116 to determine the attacked distribution from one or more attacked network addresses. Specifically, the identification service 116 may obtain a listing of the currently attacked network addresses, and identify a set of distributions hosted by the content delivery system 110 that are associated with the attacked network addresses. In the instance that a single distribution is associated with the attack, the content delivery system may proceed to implement mitigation of the attack, as described below. In the instance that multiple distributions are associated with the attacked network addresses, the identification service 116 can attempt to redirect the attack to additional network addresses, in order to identify additional network addresses associated with the attack. Redirection of an attack will be described in more detail with respect to FIG. 4, below. Generally, the identification service 116 may continue to redirect an attack to additional network addresses until a combination of network addresses is obtained that uniquely identifies a targeted distribution.

After identifying a targeted distribution, the content delivery system 110, at (7), attempts to mitigate the network attack. In one embodiment, attack mitigation may include altering the configuration of the content delivery system 110 to reduce the effects of the attack on non-attacked distributions. For example, due to the shared nature of individual network addresses, there may be a set of distributions associated with one or more attacked network addresses, but not actually targeted by the attack. To partially mitigate the attack, the content delivery system 110 may disassociate these non-attacked distributions from attacked addresses (e.g., by removing the attacked network addresses from DNS responses for non-attacked distributions), or relocate content of the non-attacked distributions to alternate locations within the content delivery system. The content delivery system 110 may further modify the attacked distribution to mitigate the attack. For example, the content delivery system may expand the number of computing devices associated with the attacked distribution, the number of network addresses associated with the attacked distribution, or both. By increasing the resources available to the attacked distribution, the impact of the attack to legitimate clients can be minimized. Thus, the content delivery system 110 may utilize knowledge as to the specific distribution (or distributions) being attacked to more efficiently implement attack mitigation strategies. In some instances, these mitigation techniques may occur automatically in response to identification of a distribution targeted by the attack, without requiring initiation of the mitigation technique by an operator of the content delivery system 110. In other instances, an operator of the content delivery system 110 may manually implement mitigation techniques after identification of the distribution targeted by the attack.

While not depicted in FIG. 3, the content delivery system 110 may additionally or alternatively attempt to detect the source of a network attack based on the combination of network addresses to which the attack is directed. As described above, each accessing computing device 102 may be distributed a unique or semi-unique combination of network addresses at which to access a requested distribution. As such, the identification service 116 may compare the combinations of network addresses distributed to each accessing computing device 102 to the set of network addresses at which an attack is directed to identify one or more devices that are potentially associated with the attack. In the instance that the set of attacked network addresses was distributed to more than a threshold number of potential attacker devices (e.g., more than one), the content delivery system 110 may attempt to determine more particularly which of the potential attacker devices is associated with the attack. For example, the content delivery system 110 may redirect the network attack to additional network addresses, as described in detail below, and determine to which potential attacker devices any additional network addresses were distributed. As a further example, the identification service 116 may compare characteristics of the network attack to known characteristics of the potential attacker devices to distinguish between those potential attacker devices. For example, assume a given set of attacked network addresses were distributed to two potential attacker devices: a first associated with a first point of entry into the content delivery system 110 (e.g., a first POP 114), the second associated with a second point of entry into the content delivery system 110 (e.g., a second POP 114). Where packets of the network attack arrived at the content delivery system 110 via the first point of entry (e.g., the first POP 114), the identification service 116 may identify the first potential attacker device as the source of the network attack. The identification service 116 may compare additional or alternative characteristics of the network attack and each potential attacker devices to distinguish the particular device executing or implementing the attack.

In the instance that the set of attacked network addresses was distributed to less than or equal to the threshold number of accessing computing devices 102 (e.g., a single accessing computing device 102), those accessing computing devices 102 may be identified as the source of the network attack. The content delivery system 110 may thereafter take action to limit further access to the content delivery system 110 by the identified accessing client computing device 102. For example, the content delivery system 110 may be modified to drop or "blackhole" packets transmitted by the identified accessing computing device 102. As a further example, the DNS servers 112A may be modified to select network addresses for distribution to the identified accessing computing device 102 from a different pool of network addresses, such that the identified accessing computing device 102 is segregated from other computing devices 110 when subsequently accessing the content delivery system 110.

Figure 4:
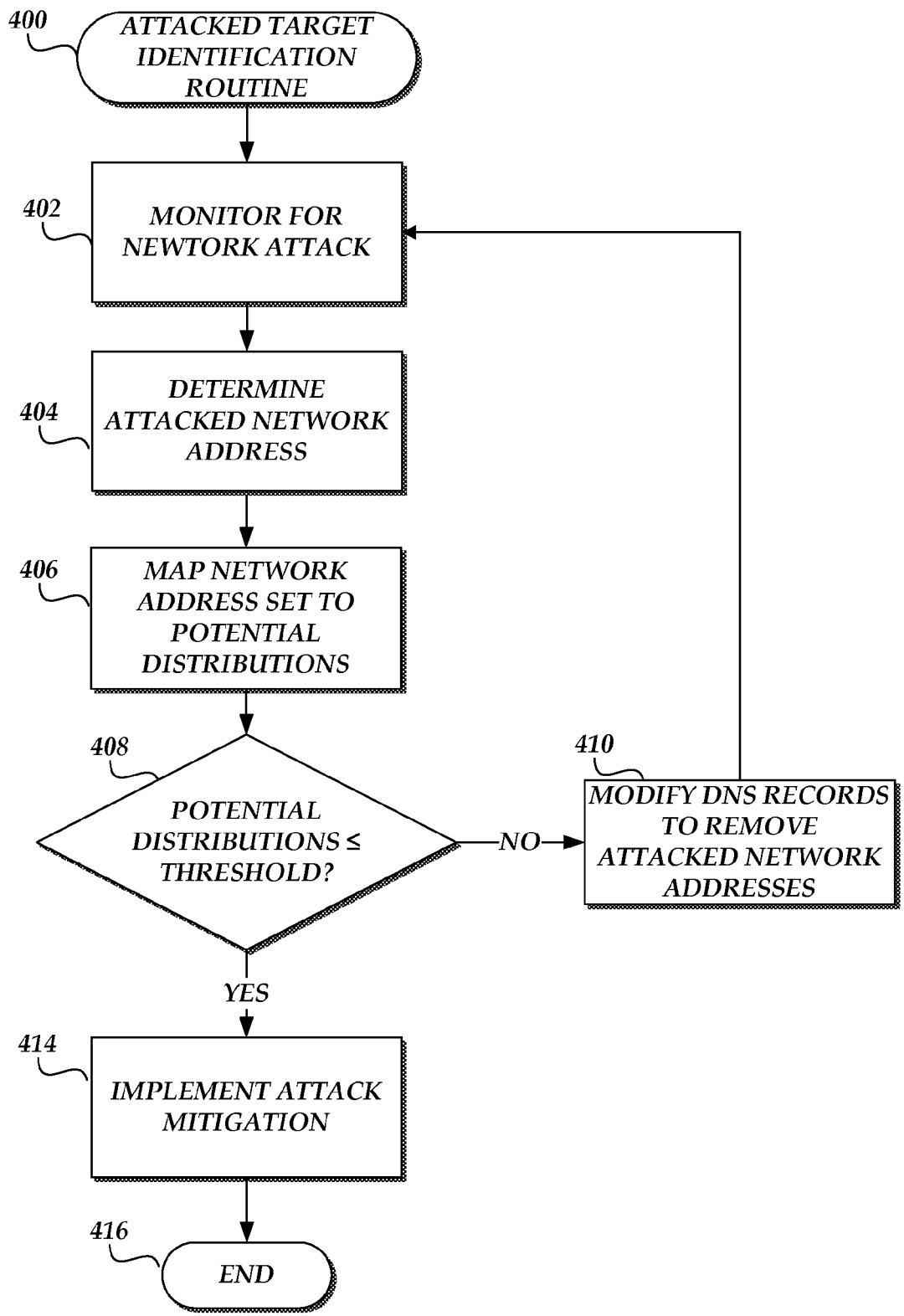
FIG. 4 is a flow chart depicting an illustrative routine for identifying the content hosted by the content delivery system 110 of FIG. 1 that is being targeted by a denial of service attack.

With reference to FIG. 4, one illustrative routine 400 for identifying the target of a network attack within a content distribution system is described. The routine 400 may be carried out, for example, by the identification service 116 of FIG. 1, either alone or in conjunction with additional elements of the content delivery system 110.

The routine 400 begins at block 402, where the identification service 116 monitors the content delivery system 110 to detect a network attack. Illustratively, the identification service 116 may detect a network attack on the content delivery system 110 by identifying a large number of anomalous packets transmitted to the system from one or more accessing computing devices. Further examples of systems and methods for detecting a network attack are described in more detail the '227 patent, incorporated by reference above.

Thereafter, the routine continues at block 404, wherein the identification service 116 identifies one or more network addresses targeted by the attack. Each targeted network address may be identified by inspecting data packets of the attack, to determine a network address to which the packet is directed. In some embodiments, actual inspection of attack packets to determine those network addresses under attack may occur at additional components of the content delivery system 110, such as routing components in communication with accessing computing devices and the identification service 116. Accordingly, the identification service 116 may, in some instances, determine attacked network addresses based on communication from those additional components of the content delivery system 110.

After obtaining a combination of network addresses under attack, the routine continues at block 406, where the identification service 116 maps the attacked network addresses to a set of distributions that are potential targets for the attack. Illustratively, the identification service 116 may map network addresses to distributions by utilizing the same algorithm used by the DNS servers to determine network addresses for a distribution (as described in FIG. 2, above). Accordingly, the identification service 116 may generate a mapping to identify, for each distribution within a specific POP 114 being attacked or for each distribution served by the content distribution system, a combination of network addresses associated with that distribution. One simplified illustration of a mapping between distributions and network addresses is shown below in TABLE 1. While only a limited number of network addresses is shown for each distribution within TABLE 1, distributions may be associated with any number of network addresses. The specific format and content of the distribution identifiers and network addresses shown in TABLE 1 is intended solely for illustrative purposes.

TABLE 1

| Distribution Identifier | Network Addresses |
|---|---|
| distribution1.pop5.cdn.tld | 192.168.0.1 |
| | 192.168.0.2 |
| | 192.168.0.3 |
| distribution2.pop5.cdn.tld | 192.168.0.1 |
| | 192.168.0.3 |
| | 192.168.0.4 |
| distribution3.pop5.cdn.tld | 192.168.0.2 |
| | 192.168.0.4 |
| | 192.168.0.5 |

As discussed above, the content delivery system 110 may, in some instances, utilize multiple pools of network addresses for distributions of different classes. Because a distribution's class may vary with time, the identification service 116 may be configured to map a distribution to a different combination of network addresses for each class potentially associated with the distribution. Illustratively, where the content delivery system 110 utilizes three classes of addresses, the identification service 116 may identify three combinations of network addresses associated with each distribution (one for each class), regardless of which class the distribution is currently classed within. In another embodiment, a history of classes associated with each distribution may be maintained within the content delivery system 110, such that the identification service 116 may identify, for each distribution, a combination of network addresses associated with each historical classification of the distribution. Accordingly, Table 1, above, may be modified to include, for each distribution, multiple combinations of network addresses, each combination being associated with a different network address pool.

The identification service 116 may then inspect the mapping to identify one or more distributions associated with the attacked network addresses, each of which constitutes a potential target for the attack. In reference to the illustrative data of TABLE 1, if a network attack were directed to the network address "192.168.0.5," the identification service 116 may determine that the attacked distribution corresponds to distribution identifier "distribution3.pop5.cdn.tld." Similarly, if a network attack were directed to the network address "192.168.0.1," the identification service 116 may determine that the attacked distribution corresponds to either distribution identifier "distribution1.pop5.cdn.tld" or distribution identifier "distribution2.pop5.cdn.tld," but not to distribution identifier "distribution3.pop5.cdn.tld".

Thereafter, at block 408, the identification service 116 may determine whether the number of previously identified distributions is less than or equal to a threshold value. Illustratively, the threshold value may be set to one to require that only a single distribution be identified as the target of an attack. Alternatively, the threshold value may be increased to allow for more than a single distribution to be identified as the target of an attack. Increasing the threshold value may be beneficial, for example, to allow mitigation techniques to be implemented more rapidly, to reduce the need to redirect network attacks (as described below), or to allow for the possibility of multiple simultaneous attacks on different distributions.

In the instance that the number of identified distributions is less than or equal to the threshold value, the routine 400 continues at block 414, where the identification service 116 can attempt to mitigate the attack. As noted above, attack mitigation may include altering the configuration of the content delivery system 110 to reduce the effects of the attack on non-attacked distributions. Illustratively, the identification service 116 may cause the content delivery system 110 to disassociate non-attacked distributions from attacked addresses (e.g., by removing the attacked network addresses from DNS responses for non-attacked distributions), or relocate content of the non-attacked distributions to alternate locations within the content delivery system. The identification service 116 may further cause the content delivery system 110 to modify the attacked distribution in an effort to mitigate the attack (e.g., by expanding the number of computing devices associated with the attacked distribution, the number of network addresses associated with the attacked distribution, or both). Accordingly, the identification service 116 may utilize knowledge of the identity of the attacked distribution to more effectively mitigate the network attack. The routine may then end at block 416.

In the instance that the number of identified distributions is greater than the threshold value, the routine 400 continues at block 410, where the identification service 116 can attempt to redirect the network attack to additional network addresses. Specifically, at block 410, the identification service 116 may transmit instructions to the DNS servers 112 within the content delivery system that cause the DNS servers 112 to stop including the initially attacked network addresses within any DNS records. In addition to helping to mitigate the attack directly (by redirecting legitimate computing devices to non-attacked network addresses), removal of the attacked network addresses may also redirect the attack to additional network addresses. For example, where an attack had been carried out on the network address "192.168.0.1," removal of that address from DNS records may cause the attack to redirect to the network address "192.168.0.2." Redirection of an attack may occur automatically or manually within the set of computing devices implementing the attack. For example, software used to execute an attack may automatically and continuously resolve a distribution identifier (e.g., a domain name) into a combination of network addresses, and select a subset of the resolved addresses to target in an attack. By removal of initially attacked network addresses from DNS records, such software can be caused to attack additional network addresses, thereby allowing the content delivery system 110 to accurately determine the specific distribution targeted in the attack. In other instances, an attacker may automatically or manually detect that an initially attacked network address has been removed from DNS records (e.g., by analyzing DNS records for the attacked distribution, by observing that the attacked distribution is still accessible, etc.), and redirect the attack to additional network addresses of the targeted distribution. Such additional network addresses may be known to the attacker from prior DNS records (e.g., obtained prior to an attack), or from DNS records received from the DNS servers 112 after removal of the initially attacked network addresses.

In one embodiment, removal of an attacked network address from DNS records for a distribution may reduce the number of network addresses those DNS records. For example, where a combination of n addresses is assigned to a distribution, removal of a single attacked network address form DNS records for the distribution may result in DNS records including n–1 network addresses. In other embodiments, DNS servers 112 may replace removed network addresses with alternative addresses assigned to the distribution. For example, where the content delivery system 110 associates distributions with multiple classes, each associated with distinct pools of network addresses, removal of an attacked network address from DNS records for a distribution may be achieved by altering a class of the distribution on the content delivery system 110. Illustratively, each distribution associated with an attacked network address may be reclassified from the "normal" class to the "high risk" class. Because each class can be associated with a different network address pool, reclassification of the distributions can cause the combination of network addresses distributed by the DNS servers 112 for the distributions to change. For example, the DNS servers 112 may halt distributing IP addresses in the "192.168.0/24" IP block for each attacked distribution, and begin distributing IP addresses in the "192.168.1/24" IP block. Such substitution of network address combinations can enable attacked network addresses to be removed from DNS records, without reducing the number of network addresses reported for each distribution. After redirection of the attack to one or more additional network addresses, the routine 400 can continue at block 402, where the identification service 116 attempts to detect the attack on one or more additional network addresses. The identification service 116 can then, at blocks 404 and 406, use these additional network addresses, in addition to the initially attacked network addresses, to identify a set of distributions potentially under attack. The identification service 116 may continue to loop through blocks 402 through 410 until the decision at block 408 is satisfied. Thereafter, the routine 400 can continue at block 414, as described above. The routine 400 may then end at block 416.

One skilled in the art will appreciate that the routine 400 may include fewer or more interactions than described above. Illustratively, in addition to redirecting a network attack by removing attacked addresses from DNS records, the identification service 116 may directly limit traffic to an attacked address. In one embodiment, the identification service 116 may "blackhole" one or more attacked addresses by instructing routing devices within the content delivery system 110 to discard (or "drop") packets directed to the attacked addresses. In addition to helping mitigate the network attack (by reducing the load on the content delivery system 110), this technique may serve to more effectively redirect a network attack to additional network addresses. As a further illustration, the routine 400 may be modified to enable identification of a source of a network attack, in addition to or exclusively of identifying the target of the network attack. For example, where network addresses for distributions are distributed on a per-device basis, block 404 may be modified or replaced, such that the routine 400 attempts to identify accessing computing devices 102 that were provided within the attacked network addresses (e.g., by comparing the attacked network addresses to the combinations of network addresses distributed to individual computing devices 102). Further, block 408 may be modified to determine whether a number of identified accessing computing devices 102 satisfies a threshold value. If so, the mitigation implemented at block 414 may include mitigations specifically targeted at the identified accessing computing devices 102 (e.g., by blackholing packets sent from the identified accessing computing devices 102, or by provided different network addresses to the identified accessing computing devices 102 in response to DNS requests by such devices). If the identified accessing computing devices do not satisfy the threshold value, the routine 400 may continue at block 410, where one or more attacked network addresses are removed from DNS records in an attempt to redirect the network attack to additional network addresses. As such, the routine 400 may be implemented to identify a source of a network attack, additionally or alternatively to identifying a target of the network attack. Accordingly, the interactions of routine 400 are intended to be illustrative in nature, rather than exhaustive.

Figure 5:
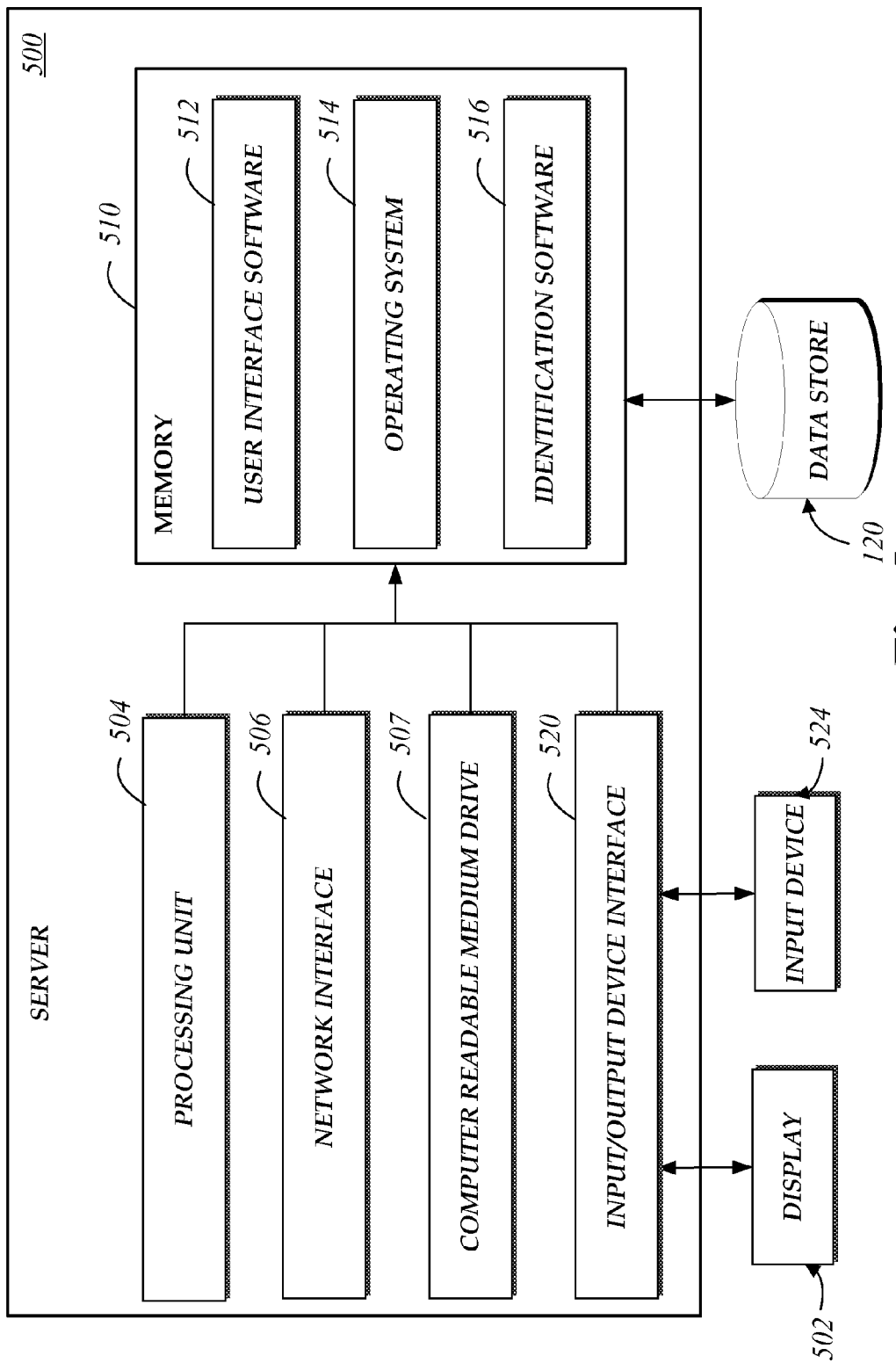
FIG. 5 is a block diagram depicting an illustrative configuration of one embodiment of the identification service 116 of FIG. 1.

FIG. 5 depicts one embodiment of an architecture of a server 500 that may implement the identification service 116 described herein. The general architecture of server 500 depicted in FIG. 5 includes an arrangement of computer hardware and software components that may be used to implement aspects of the present disclosure. As illustrated, the server 500 includes a processing unit 504, a network interface 306, a computer readable medium drive 507, an input/output device interface 520, a display 302, and an input device 524, all of which may communicate with one another by way of a communication bus. The network interface 306 may provide connectivity to one or more networks or computing systems, such as the network 106 of FIG. 1. The processing unit 504 may thus receive information and instructions from other computing systems or services via a network. The processing unit 504 may also communicate to and from memory 510 and further provide output information for an optional display 502 via the input/output device interface 520. The input/output device interface 520 may also accept input from the optional input device 524, such as a keyboard, mouse, digital pen, etc. In some embodiments, the server 500 may include more (or fewer) components than those shown in FIG. 5. For example, some embodiments of the server 500 may omit the display 502 and input device 524, while providing input/output capabilities through one or more alternative communication channel (e.g., via the network interface 306).

The memory 510 may include computer program instructions that the processing unit 504 executes in order to implement one or more embodiments. The memory 510 generally includes RAM, ROM and/or other persistent or non-transitory memory. The memory 510 may store an operating system 514 that provides computer program instructions for use by the processing unit 304 in the general administration and operation of the server 500. The memory 510 may further include computer program instructions and other information for implementing aspects of the present disclosure. For example, in one embodiment, the memory 510 includes user interface software 512 that generates user interfaces (and/or instructions therefor) for display upon a computing device, e.g., via a navigation interface such as a web browser installed on the computing device. In addition, memory 510 may include or communicate with one or more auxiliary data stores, such as data store 120.

In addition to the user interface module 512, the memory 510 may include identification software 516 that may be executed by the processing unit 504. In one embodiment, the identification software 516 implements various aspects of the present disclosure, e.g., determining the target distribution of a network attack based on one or more received network addresses. While the identification software 516 is shown in FIG. 5 as part of the server 500, in other embodiments, all or a portion of the software may be implemented individual or collectively by one or more alternative computing devices within the content delivery system 110, such as computing devices within each POP 114.

While FIG. 5 is described above with reference to implementing the identification service 116, the server 500 may additionally or alternatively implement functionality corresponding to the mitigation service 118. Illustratively, the memory 510 may include additional mitigation software (not shown in FIG. 5) that contains computer-executable instructions that, when executed by the server 500, causes the server 500 to implement aspects of the present disclosure, e.g., by modifying the routing of requests for an attacked distribution. In other embodiments, all or a portion of the mitigation software may be implemented individually or collectively by one or more alternative computing devices within the content delivery system 110, such computing devices within each POP 114.

Figure 6:
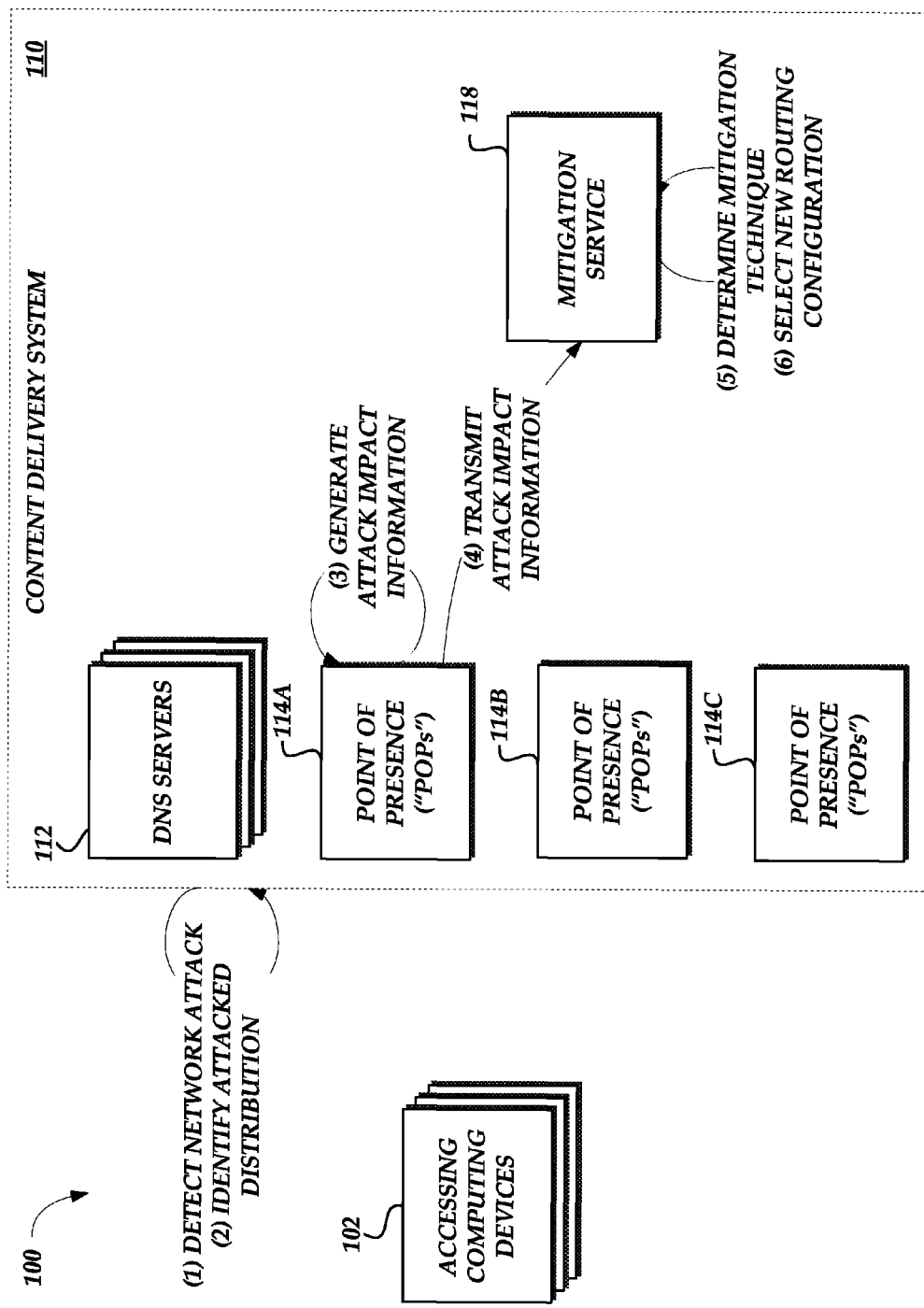
FIG. 6 is a block diagram depicting interactions on the content delivery system 110 to gather impact information regarding an attack.

With reference to FIG. 6, a set of illustrative interactions are depicted for mitigating a network attack on a distribution of the content delivery system 110. The interactions of FIG. 6 begin at (1), where the content delivery system detects a network attack, such as by monitoring network traffic transmitted to the content delivery system 110 and identifying a large volume of anomalous traffic directed to the attacked network addresses. Thereafter, at (2), the content delivery system identifies one or more distributions on the content delivery system that are targeted in the attack, in accordance with embodiments of the present disclosure described above.

The content delivery system 110 may be programmed to carry out a variety of potential mitigations for a network attack, which may depend in part on the severity of the attack. Accordingly, at (2), one or more POPs experiencing the network attack (e.g., receiving data packets identified as forming part of the network attack), such as POP 114A, may generate attack impact information. In one embodiment, the attack impact information may include one or more metrics indicative of the effect of the attack on the POP 114A itself. For example, the attack impact information may include absolute metrics as to the amount of data associated with the attack, such as the number of packets-per-second ("pps") or bits-per-second ("bps") attributed to the attack. The attack impact information may further include relative metrics indicating what portion of the POP 114As capacity is utilized during the network attack (e.g., 50% of capacity, 100% of capacity, etc., where total capacity may be a pre-established value for a given POP 114), what level of CPU usage is experienced at individual computing devices of the POP 114A. Still further, the attack impact information may include other metrics, such as the percentage of packets dropped or timed-out at the POP 114A, the time taken to process each request at the POP 114, a status of a health check on the POP 114A (e.g., based on a response to network transmissions, such as an ICMP ping), automatic changes of configuration of the POP 114A (e.g., a change in IP addresses assigned to the POP 114A via an automated IP allocation process) or the number of service level agreement (SLA) violations by the POP 114A (where the SLA indicates, for example, standards for assessing the time taken by the POP 114A to service a client request). In some instances, one or more metrics may also indicate effects of the attack on devices outside of the POP 114A. For example, the POP 114A may monitor a number of retransmission packets received at the POP 114A, which may indicate that an upstream device (such as a router on the network 106) is overloaded.

At (4), the gathered attack impact information is transmitted to the mitigation service 118, which may, at (5), use the attack impact information to determine a mitigation for the attack. In one embodiment, the mitigation service 118 may maintain a set of rules indicating one or more mitigations to be implemented in response to specific impact metrics. For example, the mitigation service 118 may maintain a set of rules, each of which indicates a set of criteria corresponding to the attack impact metrics and a corresponding mitigation technique. Thereafter, the mitigation service may compare the received attack impact metrics to the rules in order to determine one or more applicable mitigation techniques, and may then implement those techniques. In some instances, the rules may be ordered or prioritized, such that the techniques are implemented in the order specified in the rules (e.g., with a predetermined period of time between each mitigation technique). For example, a rule may indicate that where an attack is under a first threshold level of bits-per-second, the attack should be rerouted to a POP 114 implementing DDoS protection software. A second rule may indicate that where an attack is at or over the first threshold, but under a second threshold, the attack should be rerouted to multiple POPs 114 via an anycast mechanism. Any number of additional or alternative rules may be established to reroute an attack in accordance with the requirements of the content delivery system 110.

Thereafter, at (6), the mitigation service 118 selects a new routing configuration used to implement the determined mitigation technique. In one embodiment, the routing configuration may be directly specified by mitigation rules (e.g., "reroute all attacks with under a threshold number of bit-per-second to POP 114C"). In another embodiment, the mitigation service 118 may be configured to determine an appropriate routing configuration based on parameters specified within mitigation rules (e.g., "reroute all attacks with under a threshold number of bits-per-second to a POP 114 executing DDoS protection software"). Thereafter, the mitigation service 118 may modify the content delivery system 110 or external routing devices in order to implement the determined routing configuration.

As discussed above, redirection of network attacks may depend at least in part on whether the attack is or is not re-resolving. Specifically, re-resolving attacks may be redirected based on modification of resolution records, while attacks that are not re-resolving may require redirection based on updating the routing for an attacked network address (e.g., via a routing protocol). Accordingly, interactions for modifying the content delivery system 110 or external routing devices in order to implement the determined routing configuration will be discussed with respect to both FIGS. 7 and 8, below, wherein FIG. 7 represents interactions for utilizing modified resolution records, such as DNS records, to implement a determined routing configuration, and wherein FIG. 8 represents interactions implementing a determined routing configuration by updating the routing for an attacked network address.

Figure 7:
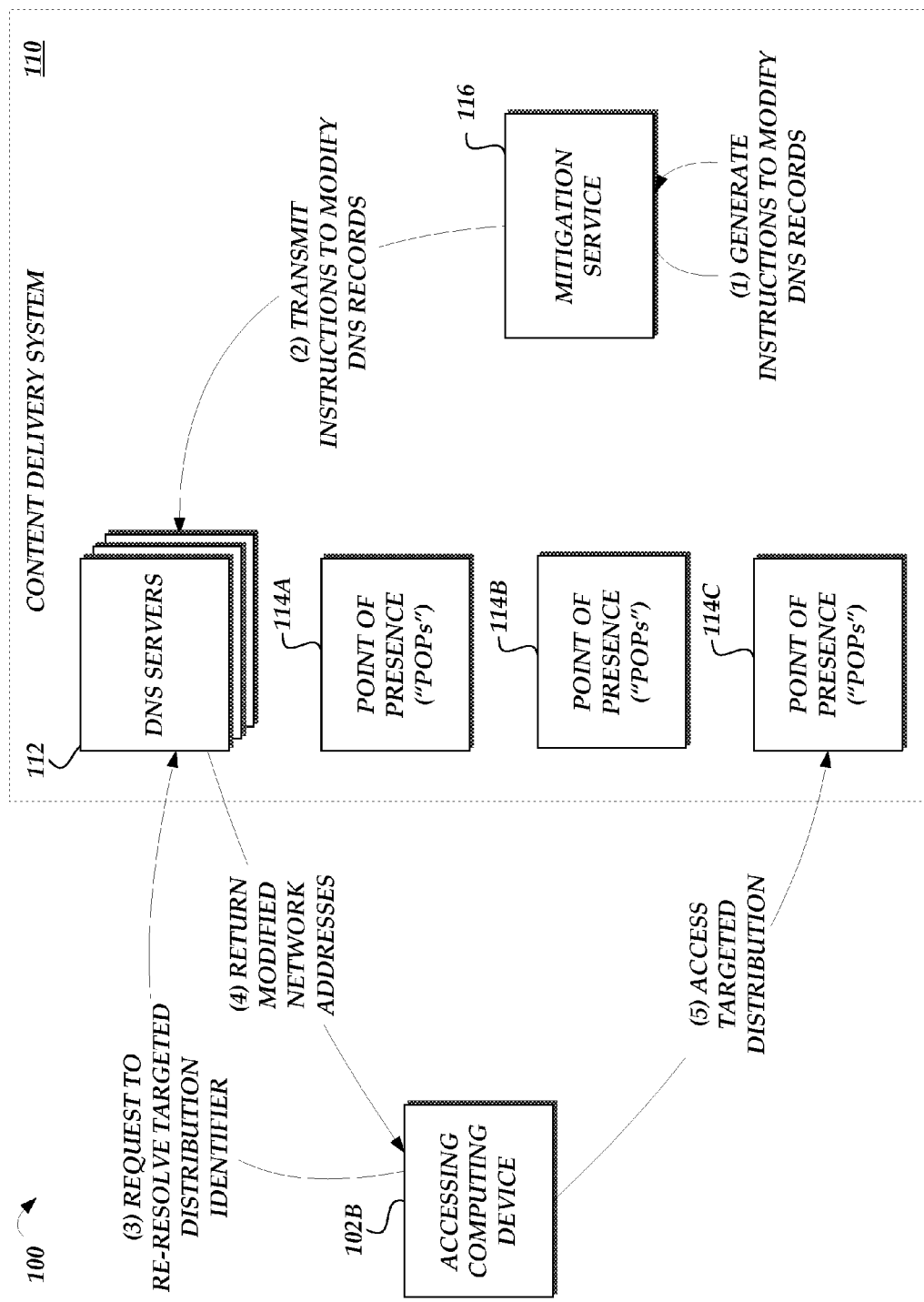
FIG. 7 is a block diagram depicting interactions on the content delivery system 110 to implement mitigation of a network attack based on modification of resolution records.
Figure 8:
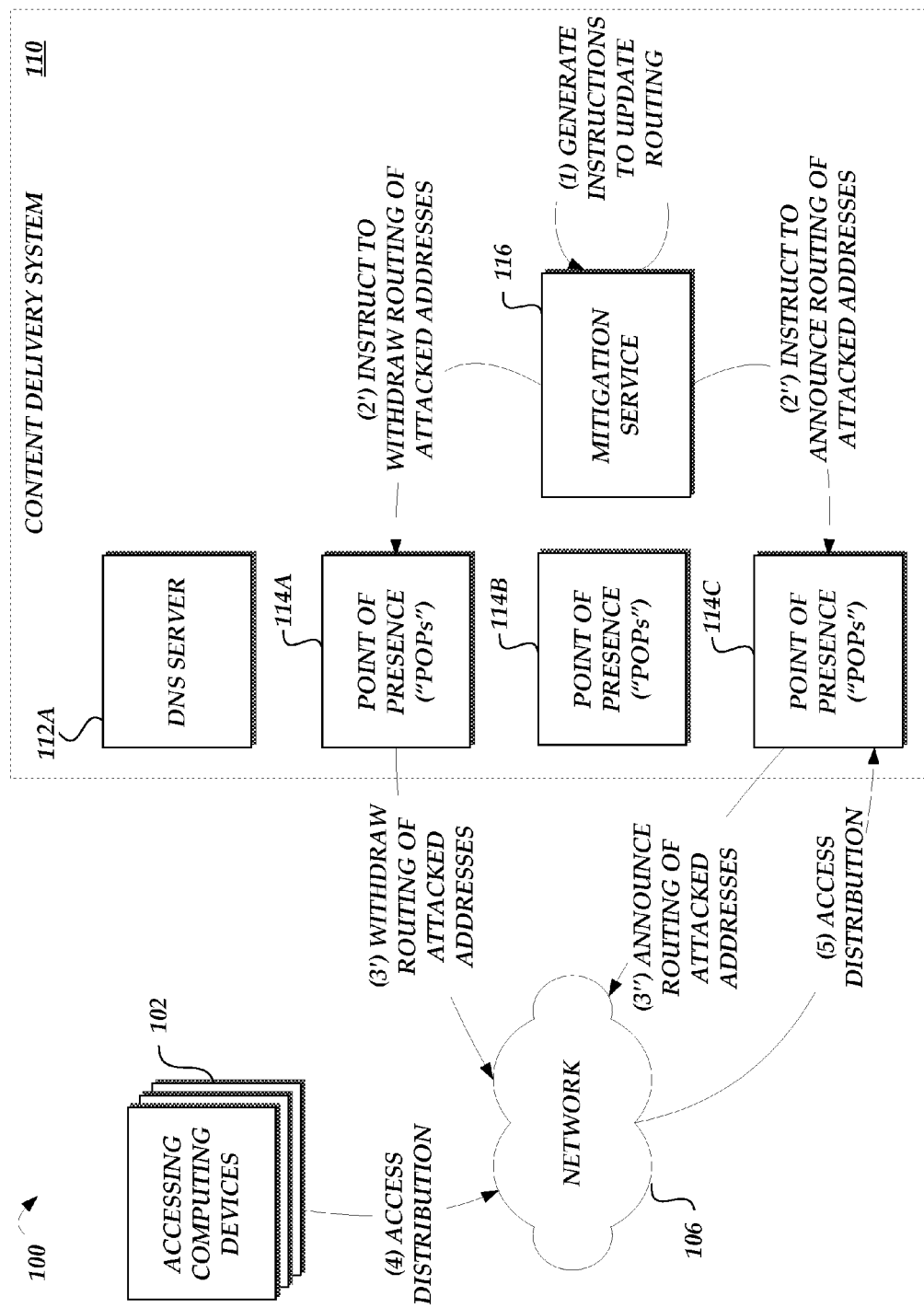
FIG. 8 is a block diagram depicting interactions on the content delivery system 110 to implement mitigation of a network attack based on modification of network routing.

With reference to FIG. 7, the depicted interactions begin at (1), where the mitigation service generates instructions to DNS servers 112 of the content delivery system 110 to implement a routing configuration (e.g., the new routing configuration selected at interaction (6) of FIG. 6). In one embodiment, the instructions may specify one or more distributions affected by a network attack (e.g., those targeted in the attack, those sharing network addresses with a distribution targeted in the attack, etc.), and for each distribution, a specific set of network addresses to provide to clients in response to requests to resolve an identifier of that distribution. For example, where a distribution is associated with a URI "www.distributionA.tld," the instructions may specify that DNS servers 112 are to resolve results for network addresses of the distribution into the IP addresses "10.1.1.2" and "10.1.1.3" (which may, for example, correspond to a POP 114 executing DDoS protection software, to multiple POPs 114 via anycast addressing, or to a network "blackhole route"). In another embodiment, the instructions may include other information enabling the DNS servers 112 to implement the routing configuration. For example, the instructions may specify that one or more distributions are to be disassociated with a first network address pool (e.g., a default network address pool), and associated with a second network address pool (e.g. a pool of addresses identifying POPs 114 executing anti DDoS software, a pool of anycast addresses, a pool of blackholed addresses, etc.).

Thereafter, at (2), the instructions are transmitted to DNS servers 112. Illustratively, the DNS servers 112 may receive and process the instructions, such that subsequent resolution requests for distributions identified in the instructions are modified in accordance with the instructions.

As noted above, re-resolving attacks are generally characterized in their use of repeated resolution requests for a targeted distribution. Accordingly, the remaining interactions of FIG. 7 illustrate how modification of DNS records at the DNS servers 112 enable a network attack on a distribution to be redirected from a first POP 114, such as POP 114A, to an alternate POP 114, such as POP 114C. Specifically, at (3), an accessing computing device 102V associated with the attack transmits to one or more DNS servers 112 a request to resolve an identifier of the targeted distributed into a network address. The DNS server 112 may then generate a network address set for the targeted distributed in accordance with the modified DNS records, and return the network address set to the accessing computing device 102B. In one embodiment, the generated network address set may be directly specified within the previously transmitted instructions. In another embodiment, the DNS servers 112 may generate a unique or semi-unique set of network address information for the targeted distribution, in accordance with embodiments described above (e.g., at FIG. 2).

Thereafter, at (5), the accessing computing device 102B attempts to access the targeted distribution using the received network addresses (e.g., as part of a network attack on the targeted distribution). Because the received network addresses have been generated by the content delivery system 110, these addresses may correspond to any POP 114 or collection of POPs 114 on the content delivery system 110. Thus, the network may be redirected to any location desirable on the content delivery system 110.

While the interactions of FIG. 7 are described above with respect to an accessing computing device 102B associated with a network attack, similar interactions may occur with respect to other accessing computing devices 102, including legitimate computing devices. In some instances, such as instances in which the content delivery system 110 is unable to accurately distinguish between legitimate and malicious accessing computing devices 102, all computing devices may be provided by the DNS server 112 with the same network addressing information for a distribution. Thus, traffic of both legitimate and malicious accessing computing devices 102 may be redirected to the same POP 114. In other instances, such as instances in which the content delivery system 110 is able to accurately distinguish between legitimate and malicious accessing computing devices 102, malicious accessing computing devices 112 may be provided by the DNS servers 112 with different network addressing information for a distribution than is provided to legitimate accessing computing devices 112. This may enable traffic of legitimate and malicious accessing computing devices 102 to be separated, thus ensuring that access to the distribution is maintained for legitimate accessing computing devices 102.

Furthermore, while the interactions of FIG. 7 are described with respect to modifying resolution records of an attacked distribution, similar interactions may be utilized to modify resolution records for non-attacked distributions, such as those previously sharing network addresses with an attacked distribution. For example, the interactions of FIG. 7 may be repeated for non-attacked distributions, such that traffic of those distributions is rerouted to POP 114B, and is thus segregated from traffic of an attacked distribution. Such segregation may enable the content delivery system 110 to ensure the continued availability of non-attacked distributions.

With reference to FIG. 8, a set of interactions is depicted for redirected traffic of distributions based on network routing updates. As noted above, the use of routing updates may enable the content delivery system 110 to redirect traffic associated with network attacks that are not re-solving (e.g., which continue to target network addresses previously associated with a distribution on the content delivery system 110, even where subsequent resolution requests for the distribution resolve to other network addresses). The interactions of FIG. 8 begin at (1), where the mitigation service 116 generates instructions corresponding to a desired routing update for transmittal to one or more POPs 114. Illustratively, the instructions may specify one or more network addresses (e.g., associated with a distribution targeted in an attack) to be disassociated with a first POP 114 (e.g., POP 114A) and associated with a second POP 114 (e.g., POP 114C). As such, implementation of the instructions may cause traffic, such as attack traffic, directed to the one or more network addresses to be redirected from the first POP 114 to the second POP 114. Thereafter, at (2') and (2"), the mitigation service 116 transmits the instructions to the relevant POPs 114. Specifically, as shown in FIG. 8, the mitigation service 116 transmits, at (2'), a first set of instructions to POP 114A instructing the POP 114A issue a routing announcement withdrawing an association between POP 114A and network addresses under attack. Further, the mitigation service 116 transmits, at (2"), a second set of instructions to POP 114C instructing the POP 114C to issue a routing announcement creating an association between POP 114C and the network addresses under attack.

The relevant POPs 114, such as POPs 114A and 114C, then issue routing updates to associated network devices, such as devices within the network 106, at (3') and (3"). In one embodiment, the routing updates corresponding to BGP-protocol packets, and are transmitted to at least one autonomous system ("AS") in communication with the POPs 114. BGP-protocol packets are known in the art, and will not be discussed in detail herein. However, one of skill in the art will appreciate that BGP-protocol packets may be utilized to cause traffic directed to one or more network addresses to be rerouted to different POPs 114 within the content delivery system 110. Thereafter, at (4), when an accessing computing device 102 subsequently requests, as part of an attack, to access a targeted distribution, the request may be routed by the network 106, at (5'), to POP 114C. Thus, traffic associated with a network attack may be redirected from POP 114A to POP 114C, even when the attack is not re-resolving.

In some embodiments, mitigations implemented by the content delivery system 110 may utilize both resolution-based and routing-based techniques in conjunction. For example, where an attack that is not re-resolving is redirected to an alternative POP 114 via routing updates, access to non-targeted distributions initially sharing network addresses that are under attack may be redirected to still other POPs 114 via the resolution-based techniques of FIG. 7. Generally, legitimate access to the content delivery system 110 may be expected to re-resolve frequently. Thus, a combination of resolution-based and routing-based techniques may be helpful in segregating legitimate and malicious traffic.

Figure 9:
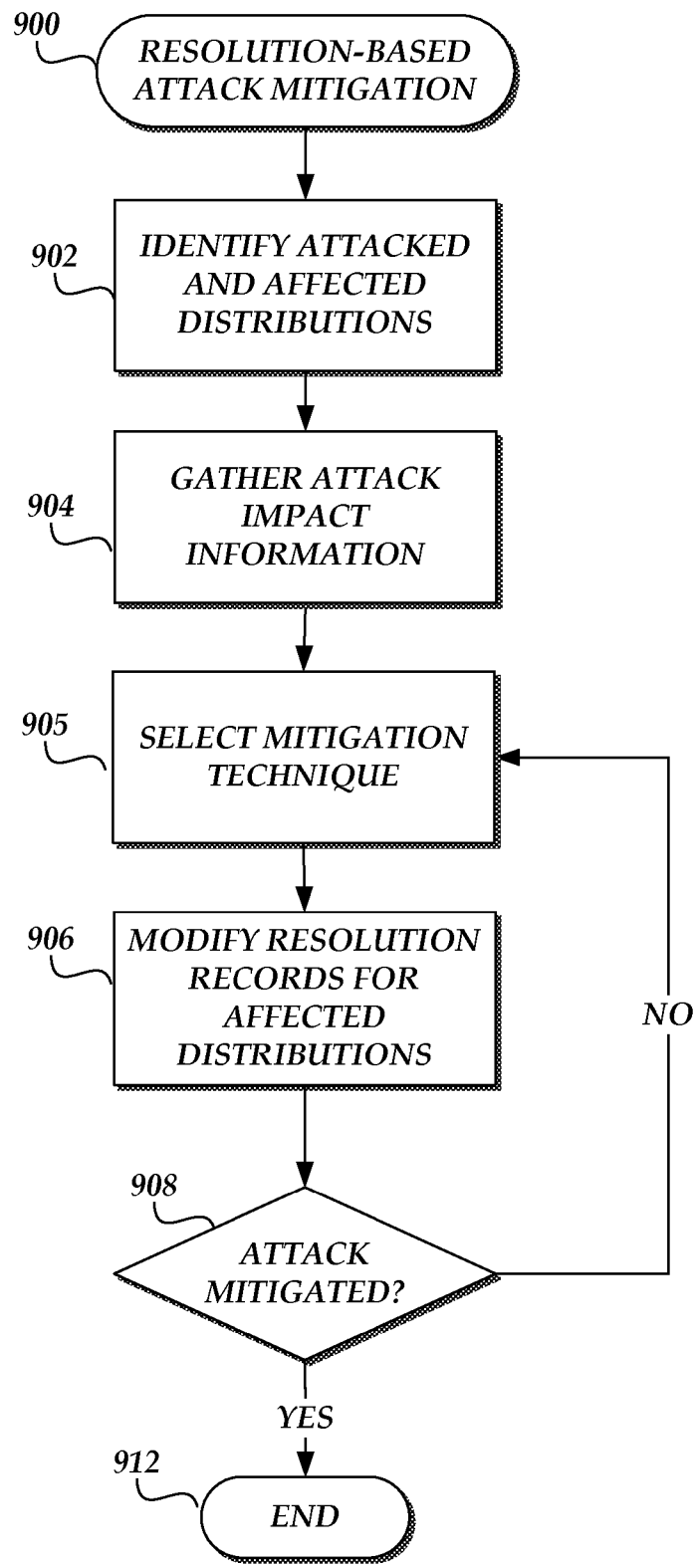
FIG. 9 is a flow chart depicting an illustrative routine for mitigating a network attack based on modification of resolution records.

With reference to FIG. 9, one illustrative routine 900 for implementing a resolution-based attack mitigation will be described. The routine 900 may be carried out, for example, by the mitigation service 118 of FIG. 1, either alone or in conjunction with additional elements of the content delivery system 110.

The routine 900 begins at block 902, where the mitigation service 118 identifies distributions affected by the attack. Illustratively, the affected distributions may include a targeted distribution (e.g., as identified in accordance with embodiments of the disclosure described above at FIG. 4), as well as non-targeted distributions sharing one or more network addresses with the targeted distribution.

At block 904, the mitigation service 118 gathers attack impact information corresponding to the attack. Illustratively, attack impact information may be gathered by interacting with or monitoring execution of various POPs 114 of the content distribution service 110, such as those POPs 114 currently associated with the affected distributions. Attack impact information may include, for example, absolute metrics as to the amount of data associated with the attack, such as the number of packets-per-second ("pps") or bits-per-second ("bps") attributed to the attack. The attack impact information may further include relative metrics indicating what portion of the POPs 114 capacity is utilized during the network attack (e.g., 50% of capacity, 100% of capacity, etc.,). Still further, the attack impact information may include other metrics, such as the percentage of packets dropped or timed-out at the POP 114A, the time taken to process each request at the POP 114 or the number of service level agreement (SLA) violations by the POP 114A. In some instances, one or more metrics may also indicate effects of the attack on devices outside of the POP 114A. For example, the attack impact information may indicate a number of retransmission packets received at each POP 114, which may indicate that an upstream device (such as a router on the network 106) is overloaded. In some embodiments, attack impact information may additionally or alternatively be gathered by use of one or more "web probes" transmitted from the mitigation service 118 or another component of the content delivery system 110. Illustratively, a number of web probes may be transmitted from the content delivery system 110, with the intention of provoking a response from a targeted network device, such as a router within the network 106. The content delivery system 110 may thereafter inspect the response to determine relevant metrics, such as the total time taken to receive the response after transmission of the web probe, or the number of web probes that did not provoke a response. These metrics may indicate a relative health of the targeted network device, and thus may be used as an indicator of the impact of the network attack on the targeted network device.

Thereafter, the routine 900 continues at block 905, where the mitigation service 118 selects a mitigation technique based at least in part on the attack impact information. In one embodiment, the mitigation technique may be selected according to one or more rules stored within a data store of the mitigation service 118. For example, the mitigation service 118 may maintain a set of rules indicating one or more criteria (e.g., corresponding to the gathered attack impact information), as well as a mitigation technique to employ when that criteria is satisfied. Illustratively, where a network attack is directed to a POP 114 not executing DDoS protection software and is causing a threshold number of SLA violations on the POP 114, a rule maintained by the mitigation service 118 may indicate that the attack should be redirected to a POP 114 executing DDoS protection software. Similarly, where an attack is directed to a POP 114 executing DDoS protection software and is causing a threshold number of SLA violations on the POP 114, a rule may indicate that the attack should be redirected to multiple POPs 114 via an anycast mechanism. The various criteria utilized by the rules may correspond to any gathered attack impact information, as well as additional or alternative information, such as client preferences for one or more affected distributions or a history of mitigation techniques already employed. The mitigations implemented by the mitigation service 118 based on the routine 900 may include any modification to resolution records (e.g., DNS records), including but not limited to: causing traffic for affected distributions to be redirected network addresses associated with alternative POPs 114, causing traffic for affected distributions to be redirected to network addresses advertised by multiple POPs 114 via anycast, causing traffic for affected distributions to be redirected to network addresses associated with specific physical ports on one or more routing devices, causing traffic for specific affected distributions (e.g., targeted and non-targeted distributions) to be redirected to different network addresses, and causing traffic for specific affected distributions to be redirected to network addresses that are specially handled by the content delivery system 110 (e.g., by "blackholing" or "tarpitting" techniques). After determining the specific mitigations to be implemented, the mitigation service 118 may, at block 906, transmit instructions to relevant components of the content delivery system 110, such as DNS servers 112, to cause traffic for affected distributions to be redirected in accordance with the mitigation technique.

Thereafter, at block 908, the mitigation service 118 may determine whether the implemented mitigation technique has been successful. In one embodiment, the mitigation service 118 may collect updated attack impact information, and analyze the attack impact information to determine whether the mitigation technique should be considered successful. For example, where a mitigation technique causes the number of SLA violations for a distribution to drop to within an acceptable threshold, the mitigation technique may be considered successful. The routine 900 may therefore end at block 912.

Alternatively, if the mitigation technique is not determined to be successful (e.g., if updated attack impact metrics do not fall within acceptable levels), the routine 900 returns to block 905, where the mitigation service 118 selects an additional or alternative mitigation. In some embodiments, the additional or alternative mitigation may be selected based on the updated attack impact information, according to rules maintained by the mitigation service 118. For example, where the updated attack impact information indicates that an attacked distribution continues to experience a threshold number of SLA violations even after redirecting traffic of that distribution to a POP 114 executing DDoS protection software, a rule maintained by the mitigation service 118 may indicate that traffic of that distribution be redirected to multiple POPs 114 via anycast network addresses. Thereafter, the routine 900 returns to block 906, when resolution records of the content delivery system 110 are modified to implement the additional or alternative mitigation technique. The routine 900 may thereafter continue until the attack is mitigated.

While the routine 900 is described above solely with respect to resolution-based redirection of traffic, the mitigation service 118 may additionally or alternatively implement routing-based redirection of traffic. For example, in some instances, at block 905, the mitigation service 118 may determine that routing-based mitigation techniques should be employed (e.g., based on attack impact information indicating that attack traffic continues to target a first set of network addresses, even after resolution requests for the distribution have been modified to include a second set of network addresses). As such, rather than proceed to block 906, the mitigation service 118 may halt execution of the routine 900 and begin implementation of a routine to implement routing-based mitigation of a network attack.

Figure 10:
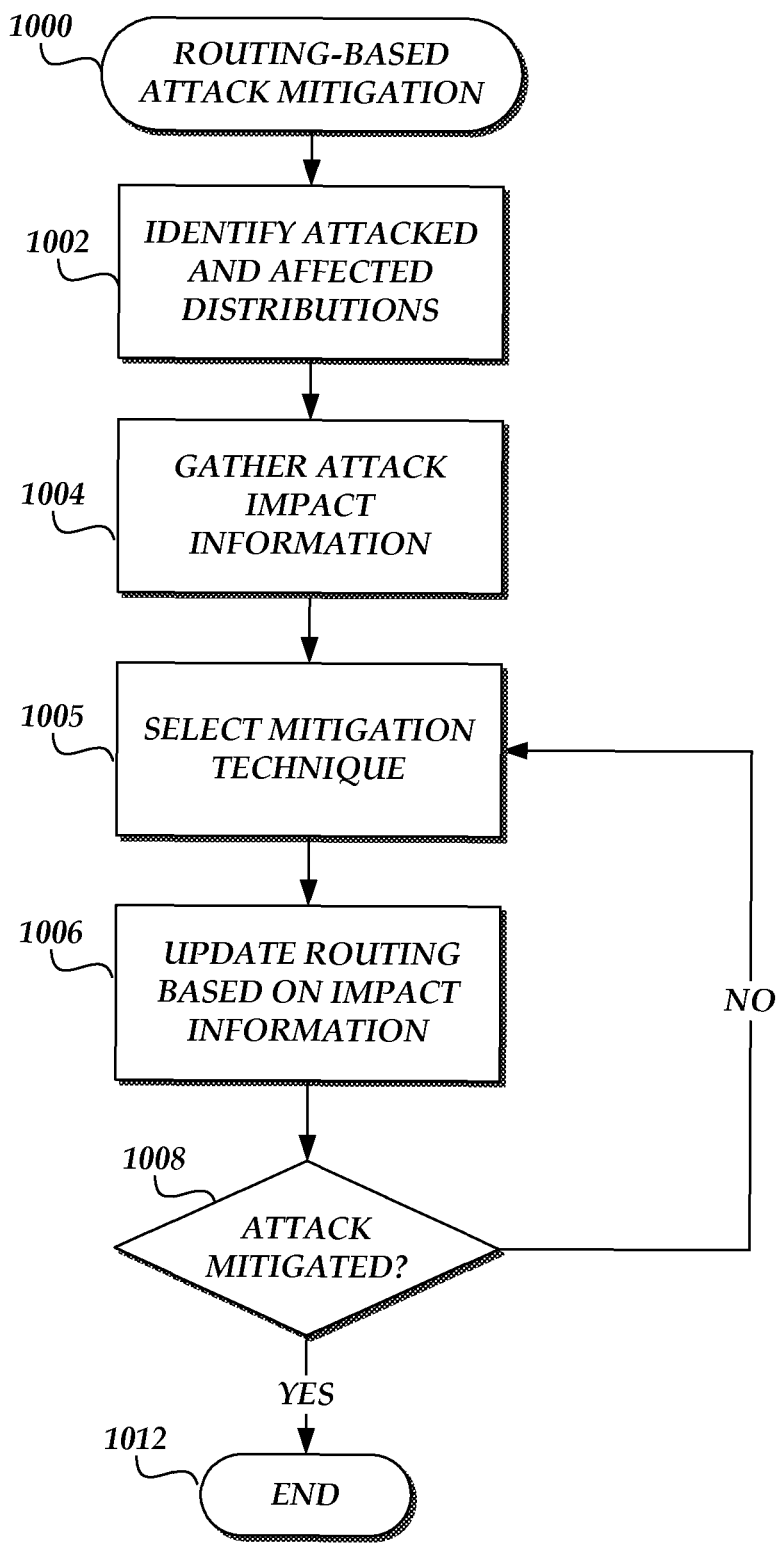
FIG. 10 is a flow chart depicting an illustrative routine for mitigating a network attack based on modification of network routing.

One example of such a routine is shown as routine 1000 of FIG. 10. As with the routine 900, above, the routine 1000 of FIG. 10 may be carried out by the mitigation service 118 of FIG. 1, either alone or in conjunction with additional elements of the content delivery system 110.

The routine 100 begins at 1002, where the mitigation service 118 identifies distributions affected by the attack, which may include a targeted distribution (e.g., as identified in accordance with embodiments of the disclosure described above at FIG. 4), as well as non-targeted distributions sharing one or more network addresses with the targeted distribution. The routine 1000 then continues to block 1004, where the mitigation service 118 gathers attack impact information corresponding to the attack. As described above, the attack impact information may include information gathered by interacting with or monitoring execution of various POPs 114 of the content distribution service 110, as well as information generated at the mitigation service 118 itself or generated by other components of the content delivery system 110 (e.g., via analysis of web probe packets).

At block 1005, the mitigation service 118 selects a mitigation technique to be employed based on the attack impact information. As described above with respect to FIG. 9, the mitigation service 118 may maintain a set of rules utilized to select an appropriate mitigation technique, each of which may specific a set of criteria and a corresponding mitigation technique to be implemented on satisfaction of the criteria. Illustratively, rules utilize by the mitigation service 118 to select a mitigation technique in accordance with the routine 1000 may specify any number of potential modifications to routing of packets destined for the content delivery system 100, including but not limited to: causing traffic for network addresses targeted in an attack to be redirected to an alternative POP 114, causing traffic for network addresses targeted in an attack to be redirected to multiple POPs 114 via anycast, causing traffic for network addresses targeted in an attack to be routed through specific physical ports on one or more routing devices of the content delivery system 110, and causing traffic for network addresses targeted in an attack to be specially handled by the content delivery system 110 (e.g., by "blackholing" or "tarpitting" those network addresses).

After determining the specific mitigations to be implemented, the mitigation service 118 may, at block 1006, transmit instructions to relevant components of the content delivery system 110, such as the POPs 114, to cause routing updates for network addresses targeted in the attack to be transmitted to relevant components of the network 106 or the content delivery system 110.

Thereafter, at block 1008, the mitigation service 118 may determine whether the implemented mitigation technique has been successful. In one embodiment, the mitigation service 118 may collect updated attack impact information, and analyze the attack impact information to determine whether the mitigation technique should be considered successful. For example, where a mitigation technique causes the number of SLA violations for a distribution to drop to within an acceptable threshold, the mitigation technique may be considered successful. The routine 1000 may therefore end at block 1012.

Alternatively, if the mitigation technique is not determined to be successful (e.g., if updated attack impact metrics do not fall within acceptable levels), the routine 1000 returns to block 1005, where the mitigation service 118 selects an additional or alternative mitigation. In some embodiments, the additional or alternative mitigation may be selected based on the updated attack impact information, according to rules maintained by the mitigation service 118. For example, where the updated attack impact information indicates that an attacked distribution continues to experience a threshold number of SLA violations even after redirecting traffic for network addresses of that distribution to a POP 114 executing DDoS protection software, a rule maintained by the mitigation service 118 may indicate that network addresses of that distribution should be advertised from multiple POPs 114 via anycast routing techniques. Thereafter, the routine 1000 returns to block 1006, when routing of traffic directed to the content delivery system 110 is further updated to implement the additional or alternative mitigation technique. The routine 1000 may thereafter continue until the attack is mitigated.

While the routines 900 and 1000 of FIGS. 9 and 10, respectively, are described separately above, embodiments of the present disclosure may in some instances implement the routines in combination. For example, the mitigation service 188 may, in some instances, maintain a set of rules that specifies, for a given set of attack impact information, whether a resolution-based mitigations, a routing-based mitigation, or a combination of mitigations should be employed to mitigate a network attack. Thus, the separate description of routines 900 and 1000 is not intended to imply that the techniques and functionalities described therein must be implemented separately.

All of the methods and processes described above may be embodied in, and fully automated via, software code modules executed by computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A content delivery system comprising:
a first point of presence ("POP") comprising a first plurality of computing devices, the first POP configured to retrieve and respond to client requests for a plurality of sets of content;
a second POP comprising a second plurality of computing devices, the second POP configured to retrieve and respond to client requests for the plurality of sets of content; and
one or more computing devices implementing an attack mitigation service, the one or more computing devices configured with specific computer-executable instructions to:
detect a network attack on the first POP, wherein the network attack is directed to a combination of network addresses utilized by the first POP;
identify, based at least in part on the combination of network addresses, a first set of content, from the plurality of sets of content, as a target of the network attack;
identify, based at least in part on the combination of network addresses, a second set of content, from the plurality of sets of content, as not targeted by the network attack, wherein the second set of content is made available at at least one network address of the combination of network addresses;
disassociate the second set of content from the at least one network address; and
modify routing of network transmissions to the first set of content based at least partly on transmitting instructions to the first POP to withdrawal its association with the combination of network addresses and transmitting instructions to the second POP to generate an association between the second POP and the combination of network addresses.

2. The content delivery system of claim 1, wherein the combination of network addresses includes internet protocol (IP) addresses.

3. The content delivery system of claim 1, wherein the network attack is a denial of service (DoS) attack.

4. The content delivery system of claim 1, wherein the instructions to the first POP to withdrawal its association with the combination of network addresses comprise instructions for the first POP to generate a border gateway protocol ("BGP") packet and transmit the BGP packet to at least one router in communication with the first POP.

5. The content delivery system of claim 1, wherein the specific computer-executable instructions configure the one or more computing devices to disassociate the second set of content from the at least one network address at least partly by transmitting instructions to a domain name system ("DNS") server to provide, in response to requests to resolve an identifier of the second set of content, network addresses associated with a third POP of the content delivery system.

6. The content delivery system of claim 1, wherein the specific computer-executable instructions further configure the one or more computing devices to transmit instructions to a third POP to generate an association between the third POP and least one network address.

7. The content delivery system of claim 1, wherein individual sets of content, within the plurality of sets of content, correspond to individual domain names.

8. The content delivery system of claim 1, wherein individual sets of content, within the plurality of sets of content, correspond to individual web sites.

9. The content delivery system of claim 1, wherein individual sets of content, within the plurality of sets of content, correspond to individual network-accessible services.

10. A computer-implemented method comprising:
detecting a network attack on a first set of computing devices of a content delivery system, wherein the network attack is directed to a combination of network addresses utilized by the first set of computing devices, and wherein the first set of computing devices provide access to a plurality of sets of content;
identifying a first set of content, from the plurality of sets of contents, as a target of the network attack based at least partly on the combination of network addresses to which the attack is directed;
identifying, a second set of content, from the plurality of sets of contents, as not targeted by the network attack based at least partly on the combination of network addresses to which the attack is directed, wherein the second set of content is made available at at least one network address of the combination of network addresses; and
mitigating the network attack based at least in part on disassociating the second set of content from the at least one network address and transmitting instructions to one or more routing devices, in communication with the content delivery system, to redirect traffic addressed to the combination of network addresses from the first set of computing devices to a second set of computing devices on the content delivery system.

11. The computer-implemented method of claim 10, wherein the instructions cause the one or more routing devices to associate the second set of computing devices with the combination of network addresses via anycast routing.

12. The computer-implemented method of claim 10, wherein the instructions cause the one or more routing devices to limit traffic addressed to the combination of network addresses to less than all physical ports on the one or more routing devices.

13. The computer-implemented method of claim 10 further comprising:
gathering impact data for the network attack from the content delivery system; and
selecting the second set of computing devices based at least in part on comparing the impact data to a set of rules associating impact data criteria to potential sets of computing devices.

14. The computer-implemented method of claim 10, wherein identifying the first set of content as the target of the network attack comprises determining that the combination of network addresses is included within a set of network addresses that identifies the first set of content.

15. The computer-implemented method of claim 10 further comprising:
gathering impact data for the network attack on the second set of computing devices;
determining that the impact data satisfies a threshold value; and
modifying a routing configuration of the content delivery system to cause data addressed to the combination of network addresses to be discarded.

16. Non-transitory computer-readable media comprising computer-executable instructions that, when executed by a computing system, cause the computing system to:
detect a network attack on a content delivery system, wherein the network attack is directed to a combination of addressing information sets utilized by one or more computing devices of the content delivery system, and wherein the one or more computing devices provide access to a plurality of sets of content;
identify a first set of content, from the plurality of sets of contents, as a target of the network attack based at least partly on the combination of addressing information sets to which the attack is directed;
identify a second set of content, from the plurality of sets of contents, as not targeted by the network attack based at least partly on the combination of addressing information sets to which the attack is directed, wherein the second set of content is made available at at least one addressing information set of the combination of addressing information sets; and
mitigate the network attack based at least in part on disassociating the second set content from the at least one addressing information set and modifying a routing of the combination of addressing information sets within the content delivery system.

17. The non-transitory computer-readable media of claim 16, wherein addressing information sets comprise at least one of a network address, a port number, and a protocol.

18. The non-transitory computer-readable media of claim 16, wherein execution of the computer-executable instructions further causes the computing system to mitigate the network attack based at least in part on transmitting instructions to a routing device within the content delivery system to associate one or more alternative computing devices with the combination of addressing information sets.

19. The non-transitory computer-readable media of claim 18, wherein execution of the computer-executable instructions further causes the computing system to:
obtain impact data for the network attack from the content delivery system; and
select the one or more alternative computing devices at least partly by comparing the impact data to a set of rules maintained in a data store of the content delivery system, the set of rules associating impact data criteria to potential alternative computing devices.

20. The non-transitory computer-readable media of claim 19, wherein the set of rules map impact data criteria to potential alternative computing devices based at least in part on characteristics of the alternative computing devices.

21. The non-transitory computer-readable media of claim 20, wherein the characteristics of the alternative computing devices include at least one of an amount of computing resources available to the alternative computing devices or an association of the alternative computing devices with network attack mitigation software.

22. The non-transitory computer-readable media of claim 16, wherein execution of the computer-executable instructions causes the computing system to disassociate the second set content from the at least one addressing information set at least partly by transmitting instructions to a domain name system ("DNS") server to provide, in response to requests to resolve an identifier of the second set of content, a second combination of addressing information sets.

23. The non-transitory computer-readable media of claim 16, wherein execution of the computer-executable instructions further causes the computing system to identify, based at least in part on the combination of addressing information sets, the first set of content as a target of the network attack at least partly by determining that the combination of addressing information sets is included within a plurality of addressing information sets that identify the first set of content.

* * * * *

UNITED STATES PATENT AND TRADEMARK OFFICE
CERTIFICATE OF CORRECTION

| | |
|---|---|
| PATENT NO. | : 9,742,795 B1 |
| APPLICATION NO. | : 14/864683 |
| DATED | : August 22, 2017 |
| INVENTOR(S) | : Anton Stephen Radlein et al. |

It is certified that error appears in the above-identified patent and that said Letters Patent is hereby corrected as shown below:

In the Claims

In Column 37 at Line 5, in Claim 6, before "least" insert --at--.

Signed and Sealed this
Twenty-seventh Day of February, 2018

Andrei Iancu
*Director of the United States Patent and Trademark Office*